United States Patent [19]
Ross et al.

[11] Patent Number: 5,107,664
[45] Date of Patent: Apr. 28, 1992

[54] VEGETABLE TOPPER AND METHOD FOR TOPPING TUBER VEGETABLES

[75] Inventors: Earl J. Ross; Rickey L. Ross, both of Fresno, Calif.; Alan D. Saito, Weiser, Id.; Raymond G. Saito, Weiser, Id.; Bretney R. Karnes, Weisner, Id.

[73] Assignee: Veggie Vac Company, Weiser, Id.

[21] Appl. No.: 731,209

[22] Filed: Jul. 15, 1991

[51] Int. Cl.⁵ ...................... A01D 23/00; A01D 33/02
[52] U.S. Cl. .................................. 56/121.4; 56/13.1; 56/121.44; 171/17
[58] Field of Search .................... 56/12.9, 13.1, 121.4, 56/121.44, 121.45, 327.1, DIG. 8; 171/17, 41, 120, 130, 131

[56] References Cited

U.S. PATENT DOCUMENTS

| | | | |
|---|---|---|---|
| 1,347,733 | 7/1920 | Davis | 56/158 |
| 2,026,291 | 12/1935 | Tirimacco | 56/13.3 |
| 2,453,714 | 11/1948 | Lapointe | 171/130 X |
| 2,579,013 | 12/1951 | Sampson | 56/12.9 X |
| 2,651,157 | 9/1953 | Drake | 171/17 X |
| 2,734,331 | 2/1956 | Phillips | 56/296 |
| 3,430,421 | 3/1969 | Matthews | 56/16.9 X |
| 3,828,531 | 8/1974 | Quick | 56/12.9 |
| 4,757,670 | 7/1988 | Kinch et al. | 56/121.42 X |
| 4,783,951 | 11/1988 | Richards et al. | 56/12.9 |
| 4,838,012 | 6/1989 | Bowen, III | 56/13.1 |
| 4,924,664 | 5/1990 | Hicks et al. | 56/202 |

FOREIGN PATENT DOCUMENTS

| | | |
|---|---|---|
| 3111390 | 10/1982 | Fed. Rep. of Germany . |
| 3317568 | 12/1983 | Fed. Rep. of Germany ... 56/121.44 |
| 1380660 | 1/1985 | U.S.S.R. . |

Primary Examiner—David J. Bagnell
Attorney, Agent, or Firm—Knobbe, Martens, Olson & Bear

[57] ABSTRACT

A vegetable topper for cutting the leafy tops off of tubers, such as onions, as they lie in the field. This improved topping system is designed to be mounted on a wheeled moveable frame towed by a tractor, which uses a vacuum to lift the tops and snip them off. The power for the vacuum fan and topping operation is supplied by a primary motor mounted on a wheeled frame, or derived from a power take-off of the tractor. The shearing means comprises a linearly reciprocating sickle blade whose angle relative to the oncoming tops may be adjusted for an optimally perpendicular shearing type of cut, providing maximum efficiency. The sheared tops are substantially mulched into fine particles within a fan in the vacuum system and dispersed to the side of the topper. A conveyor system consolidates already topped onions with a first conveyor picking up a portion of the topped onions and a second conveyor delivering said portion over the remainder of the topped onions, resulting in a reduced gathering area. Remotely steerable rear wheels provide enhanced turning capability. Lifting the front of the topper relative to the ground further maximizes maneuverability, and adjusts the cutting of the tops.

26 Claims, 14 Drawing Sheets

VEGETABLE TOPPER AND METHOD FOR TOPPING TUBER VEGETABLES

FIELD OF THE INVENTION

The present invention relates to harvesting and topping vegetables such as onions.

BACKGROUND OF THE INVENTION

In tubers, such as onion plants, the edible bulb part of the plant is below ground, while a leafy top extends above ground. An acre of commercial onions can contain between 80,000 and 150,000 plants, with each bulb weighing between ½ to 2 lbs., and with the green leafy top or stalk portion weighing almost as much as the bulb. Upon reaching maturity, the stalks of the onions wither and fall onto the ground. The bent stalks lie all over the ground and hinder visibility of, and ready access to, the ripe bulbs. The harvesting process is complicated by the matted covering of the onion tops on the ground. Some onion plants, referred to as seeders, keep growing and have green upright stalks, in contrast to the mature onions which have stalks that are bent, withered and dried. The seeders, which may make up 5-10%, or more, of the total crop yield, create a non-homogeneous crop surface which further hinders harvesting operations.

Currently, onions are uprooted by a breaker bar which is pulled below the onions to thrust the onions out of the ground. After drying for a few days, the onions are manually topped by grabbing the onion stalks and using scissors to cut off the tops, after which the onions are mechanically or manually gathered, and taken to a facility for packing or storage.

In some cases, the uprooted, untopped onions are mechanically gathered and taken to a packing area where the onions are again manually topped with scissors or clippers. All onion residues are discarded at this stage if they have not been eliminated earlier. Because the onion tops are acidic, the disposal of large quantities of onion tops gathered at the packing facilities becomes a great environmental concern, with attendant difficulties in environmentally safe disposal of large quantities of tops.

As the onion crop becomes ripe and ready for harvesting at about the same time in a given geographical region, large numbers of workers must be employed to accomplish the manual topping task. This manual labor is very expensive, and creates significant uncertainties in arranging and coordinating sufficient numbers of workers, if they are even available when needed.

While several patents disclose equipment to top onions and tubers, no such equipment is commercially used today in the United States. For example, patents to Davis (U.S. Pat. No. 1,347,733) and Sampson (U.S. Pat. No. 2,579,013) both disclose a machine for raising and cutting potato-vines and the like, and onions, respectively. In both cases, a rotary fan mounted on a wheeled frame raises the vines and onion tops for cutting. Sampson also uses a rotating belt with canvas cross-flights to push the onions up an inclined trough which ends near the rear of the frame where a crate can be positioned to receive the topped onions. A disadvantage of both devices is that only a small area below the fans can be harvested. Another disadvantage is the distribution of whole, severed vines back onto the field, covering the crops on adjacent rows which then are difficult to locate and harvest.

The Kinch patent, U.S. Pat. No. 4,757,670, describes an agricultural crop defoliator which uses a blowing technique to elevate the tops of plants for cutting. A rotating cutting blade is used that is also height-adjustable. However, rotating blades are not believed suitable for cutting some vegetable tops, such as onion tops, cleanly, as they tear the tops. This damages the bulbs, or causes the torn portion to rot. In addition, the severed tops are again left intact to be distributed over, and obstruct, access to the onions on the adjacent ground which then need to be gathered up.

Soviet Union Patent No. 3840-660-A, issued to Vege, discloses a stem cutter for trimming onion haulms (stalks). Rotating elastic rods lift the tops of the plants to come in contact with rotating blades inside a drum.

The designs of the prior devices which use suction to lift the plants are such that they harvest but one row of crops at a time. That increases the time needed to harvest a field of crops. There is thus a need for a device which can top large areas of crops at the same time.

As these machines pass over the onion field, their vacuum intakes, blower casings and elastic rods bend the plant tops. The tops are believed to meet each cutting implement at an inclined angle. The cutting implements disclosed above are oriented horizontally, and while some can move vertically, they are not designed to change this horizontal orientation. There is thus a need for a cutting blade which can cut the tops at a more perpendicular angle to the vegetable or onion top.

The harvesting equipment described in the above-mentioned patents share the common disadvantage of being cumbersome to maneuver around sharp corners, requiring large areas at the ends of the fields to allow the devices to be turned. Sampson, Kinch and Vege show simple towed devices which restrict the arc of turn to that which avoids jack-knifing or collision between the towing and towed vehicles. Davis allows for steering wheels on the front which would limit the arc of turn to that allowed by the wheel base of the device. There is thus a need for a device with steering that enables sharp corners to be made, so that more crops can be planted in the fields.

Whatever the claimed advantages of the prior equipment, the current widespread use of inefficient and costly manual labor demonstrates that these prior inventions did not succeed. There exists a need for a mechanical topper that addresses the above needs, and overcomes the drawbacks of prior vegetable topping machines by increasing the harvesting efficiency without damaging the tubers.

SUMMARY OF THE INVENTION

The vegetable topper of this invention relates to a machine and method of removing the stalks, or tops, from tubers, such as onions, by lifting the tops with a suction or vacuum and shearing them off at an angle to the generally horizontal ground. A vacuum/sickle system is mounted on a wheeled frame, which is advantageously towed behind a tractor.

The vegetable topper also relates to a system of raising and shearing the tops off of low-lying crops and then consolidating the crops for ease of gathering. One portion of the topped crops is moved onto the remaining portion of the topped crops by use of a conveyor system comprising a pick-up conveyor and an adjustable rear-cross conveyor.

Additionally, the vegetable topper relates to a system and method for discharging the tops to the side as a fine mulch using a vacuum/shearing system mounted on a wheeled, moveable frame on which is advantageously mounted a motor. The mulch degrades faster than the whole onion tops, and allows efficient disposal and use of the onion tops. The motor provides power for the vacuum fan and sickle blade, along with a number of actuating motors and pistons for turning the wheels, raising the vacuum hood, actuating the fan clutch, actuating the sickle blade, lifting the pick-up conveyor, actuating the flapper, rotating conveyor ribs, and adjusting the rear-cross conveyor position.

The present invention thus concerns an apparatus for cutting the tops off of onions without damaging the bulb of the onion. The invention comprises a fan mounted on a wheeled support frame and having a plurality of blades which rotate in a housing to create a suction. The fan is constructed with the blades sufficiently close to the housing, and rotating at such a speed that during operation the fan chops the tops of the onions into small pieces and discharges the chopped tops out of an exit from the fan housing. Advantageously, the fan has a non-stick lining on a portion of the inside of the housing adjacent the exit sufficient to prevent the chopped onion tops from sticking to the housing and clogging the fan.

A suction hood is provided which depends from the support frame to a location proximal to a plurality of onions. The hood is in fluid communication with the fan so that sufficient suction is applied to the onions under the hood to lift up the tops of the onions away from the surface on which the onions are placed. The hood has a flexible skirt around at least a substantial portion of its periphery which extends toward and can substantially enclose the onions. The hood is advantageously designed to exert a more uniform suction over the area under the hood and around the periphery.

A cutter bar is located in the suction hood and extends along the length of the suction hood for a distance sufficient to provide a scissor-like cutting action to simultaneously cut the tops off a plurality of onions as the tops are lifted by the suction. The cutter bar is angled downward and adjustably mounted so that the angle of cutting may be adjusted. Advantageously, the cutting angle may be such that the tops are cut substantially square relative to the vegetable stalk or, for example, the onion bulb.

Advantageously, the suction hood has a length sufficient to extend across a plurality of beds of onions. In a further embodiment, the apparatus comprises a pickup conveyor located behind the suction hood, with the front end of the conveyor being positionable along a substantially vertical axis. The front end extends to just behind the suction hood and rotates in a direction such that onions exiting from underneath the suction hood may be transported along the length of the pickup conveyor. Onions are urged onto the conveyor by a rotating shaft to which are attached a plurality of flexible members which rotate in a direction so as to urge the onion bulbs off of the ground onto the conveyor.

A cross-conveyor is located so as to receive onions from the pickup conveyor and oriented at an angle to the pickup conveyor to move the onions to a predetermined location. The cross-conveyor is movably mounted relative to the support frame so as to enable said predetermined location to be changed relative to the frame.

Advantageously, a motor is mounted on the frame to drive the fan, although in some embodiments, the power take off of a tractor could be used to drive the fan. In further embodiments, a pair of wheels are located at the rear of the support frame, with the wheels being steerably connected so as to enable the apparatus to turn corners sharper.

The invention also comprises an improved method of cutting the tops off of tubers while not damaging the tubers, and as such comprises the steps of using a fan with a plurality of fan blades to create a suction sufficient to lift the tops of tubers into a position for cutting; using the blades of the suction fan to further chop the cut-off tops into a plurality of small pieces; placing a non-stick surface on those portions of the fan where chopped pieces of the vegetable tops would otherwise stick in sufficient quantity to clog the fan so that the chopped tops do not stick and clog the fan; communicating the suction to an area covering a plurality of rows of tubers with sufficient suction to lift the tops of the tubers as needed for cutting; and simultaneously cutting a plurality of tops with a scissors-type cutting action by a sickle-type cutting bar.

Advantageously, the method further includes the step of adjusting the angle of the cutting bar relative to the uplifted tops so that the tops are cut off at substantially right angles to increase the cutting efficiency and speed. Further, the method may be used with the cutting step occurring either before or after the onion bulbs are broken loose from the ground.

The improved method further includes the steps of moving the topped onions from the ground to a second location by using a pickup conveyor; and moving the onions from the second location of the pickup conveyor to a third location by a cross-conveyor, the cross-conveyor being positionable to allow the third position to be changed. Advantageously, the method may further include step of steering the device which implements the method of cutting the tops of the tubers by a pair of wheels located at the rear of the device, to enable the device to turn corners sharper.

BRIEF DESCRIPTION OF THE DRAWINGS

The present invention will be better understood from the description of the illustrated embodiment which is given below, taken in conjunction with the drawings (like reference characters or numbers refer to like parts throughout the description), and in which.

DETAILED DESCRIPTION OF THE ILLUSTRATED EMBODIMENT

Figure 1:
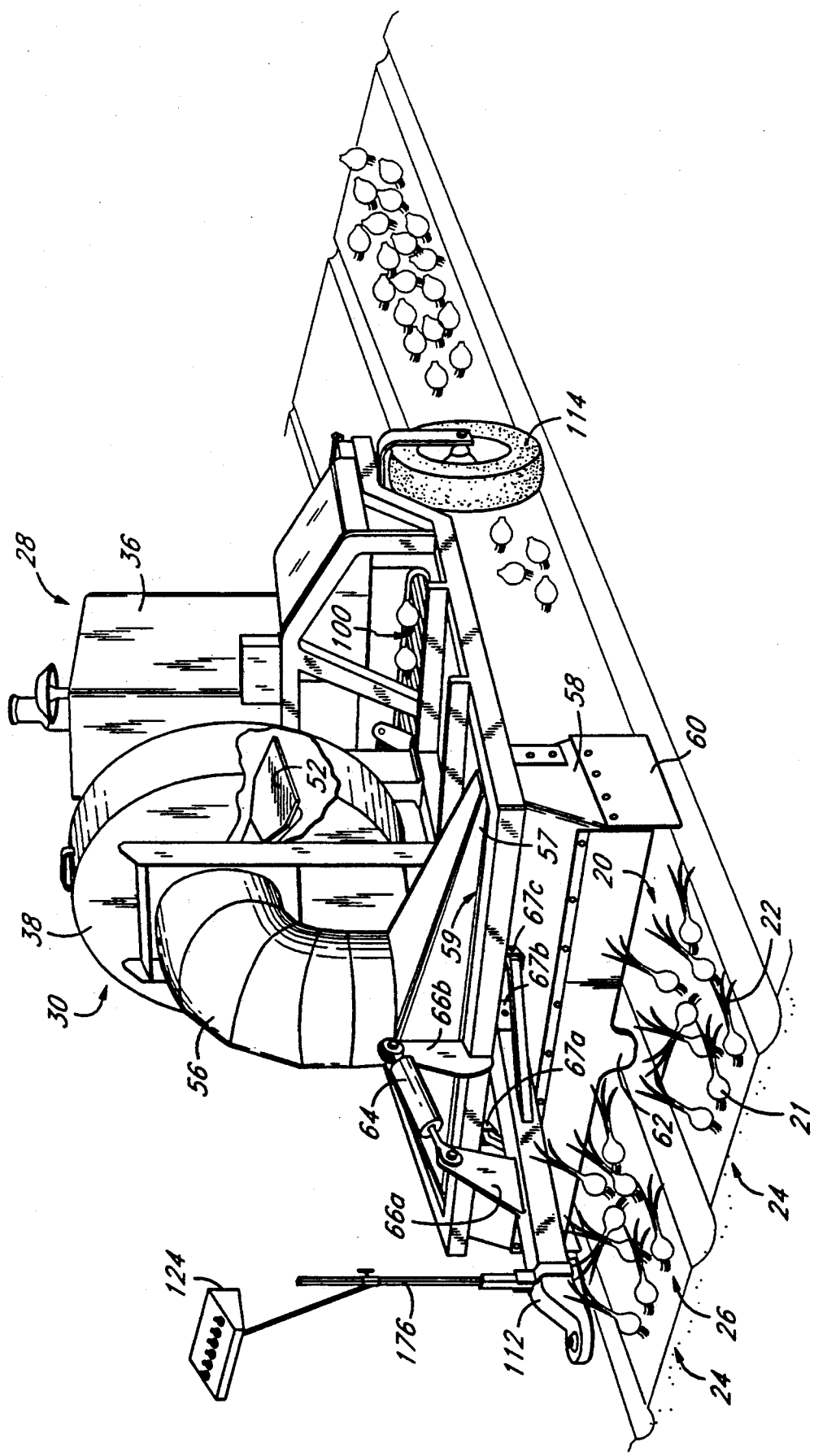
FIG. 1 is a perspective view of the vegetable topper in an onion field.

In FIG. 1, a vegetable topper 28 designed to top tubers, such as onions 20, is shown spanning two parallel onion beds 24, comprising four double rows 26 of onions 20 per bed. The beds 24 are separated by tracks for vehicle tires. The onions 20 comprise a lower bulb 21 portion and a leafy top 22 portion extending from the upper end of the bulb 21. Each of the beds 24 are generally about 40 inches wide.

As shown in FIG. 1, the onions 20, with their tops 22 still attached, have been broken loose or ejected from the ground by a breaker bar which was previously pulled through the ground, below the onions, as is well known in the art and not described in detail herein. The vegetable topper 28 will also satisfactorily remove the tops 22 of the onions 20 when the onions 20 have not been broken loose or removed from the ground by a breaker bar. Onions 20, with their tops 22 connected, are shown as they lie in the field in front of the vegetable topper 28, while the resulting topped onion bulbs 21 are seen at the rear of the vegetable topper 28. As used herein, "front" refers to the end of the vegetable topper 28 which includes a towing draw bar 112, and "rear" refers to the opposite end.

Referring to FIGS. 1-4, but primarily to FIG. 1, the vegetable topper 28 comprises a primary motor 36, hydraulic system 46 (FIG. 3), sickle blade 72 (FIG. 2), conveyor system 32 (FIGS. 3-4), vacuum system 30, and movable support frame 34 on which the above components are mounted. Preferably, the vegetable topper 28 is pulled by a tractor (not shown) through the field via the towing draw bar 112.

The power for the topping operation is supplied by the primary motor 36, which is mounted to the frame 34 along the centerline of the frame, toward the rear. A John Deere 4039 internal combustion engine providing 105 hp at 2,100 rpm has been found suitable for use as a motor 36.

Figure 3:
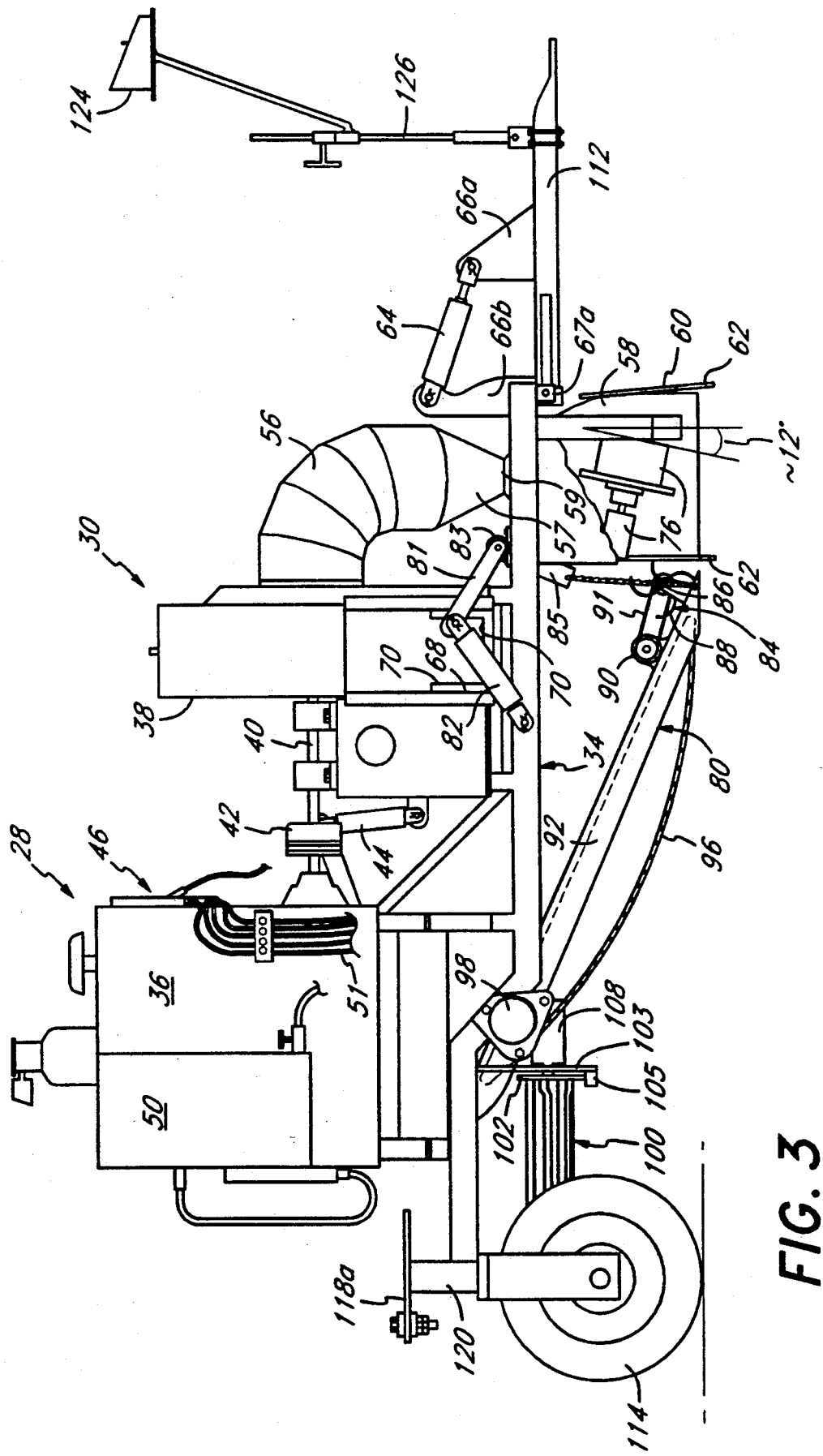
FIG. 3 is a left side view of the vegetable topper.
Figure 5:
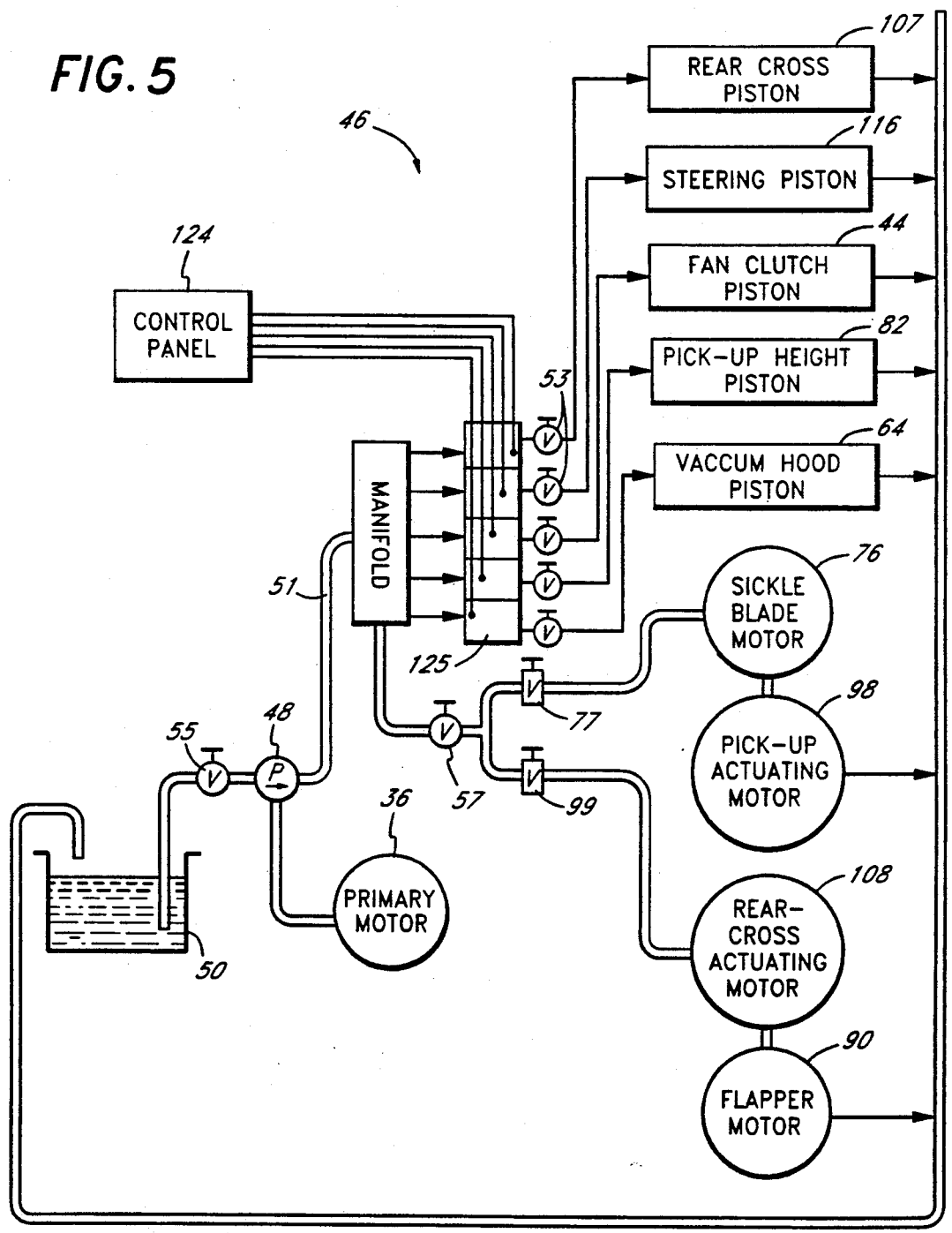
FIG. 5 is a schematic of the hydraulic system of the vegetable topper.

Referring to FIGS. 3 and 5, the hydraulic system 46 provides hydraulic fluid under pressure to a number of actuating motors and pistons. The hydraulic system 46 comprises a pump 48 that is attached to, and driven directly by, the primary motor 36. The pump 48 draws hydraulic fluid from a central reservoir 50 mounted to the rear of the primary motor 36. The hydraulic fluid is pressurized by the pump 48, and is then distributed to the various actuating motors and pistons via hoses 51. The flow rate through each of the various hydraulic components, and thus the power and speed of operation of each component, may be adjusted by valves 53 associated with each component. Shut off valve 55 located on the main hydraulic line to pump 48 allows all of the hydraulic components to be shut off at once. A secondary shut off valve 57 allows the hydraulic motor to be shut off. An L38-7053 hydraulic pump with 0-15 gpm capacity at 1,500-3,000 psi, sold by Sundstrum-Saur, has been found suitable for use as pump 48. Other actuating motors and pistons will be described later. Each actuating motor or piston receives the pressurized fluid through an inlet hose and discharges the fluid after use through an outlet hose. These outlet hoses return the used fluid back to the central reservoir 50. Suitable hoses are known in the art and not described in detail herein.

Referring to FIGS. 1-4 and 8, the vacuum system 30 lifts the tops 22 of the onions 20 for cutting. The vacuum system 30 comprises a high pressure, high velocity fan unit 38 and its drive shaft 40, an intake manifold 56 and a vacuum hood 58 with a flexible skirt 60. The primary motor 36 drives the fan unit 38 via horizontal shaft 40. The center of the fan unit 38 is aligned with the shaft 40 and connects to the motor 36 along an axis parallel to the longitudinal centerline of the frame 34. Between the primary motor 36 and fan unit 38, and in line with the shaft 40, is a friction clutch 42 for engagement and disengagement of the fan 38. A standard rotating disk friction clutch, as well known in the art and not described further herein, may be used. Engagement of the clutch 42 is controlled by a hydraulic clutch piston 44. The piston 44 has one end fixed to the frame 34 and the other end to a clutch lever 45 which engages or disengages the clutch 42. The extension of the clutch piston 44 determines the position of clutch lever 45, and thus the engagement of the clutch 42. The clutch piston 44 is in fluid communication with, and powered by, the hydraulic pump 48 through hoses 51.

Figure 7:
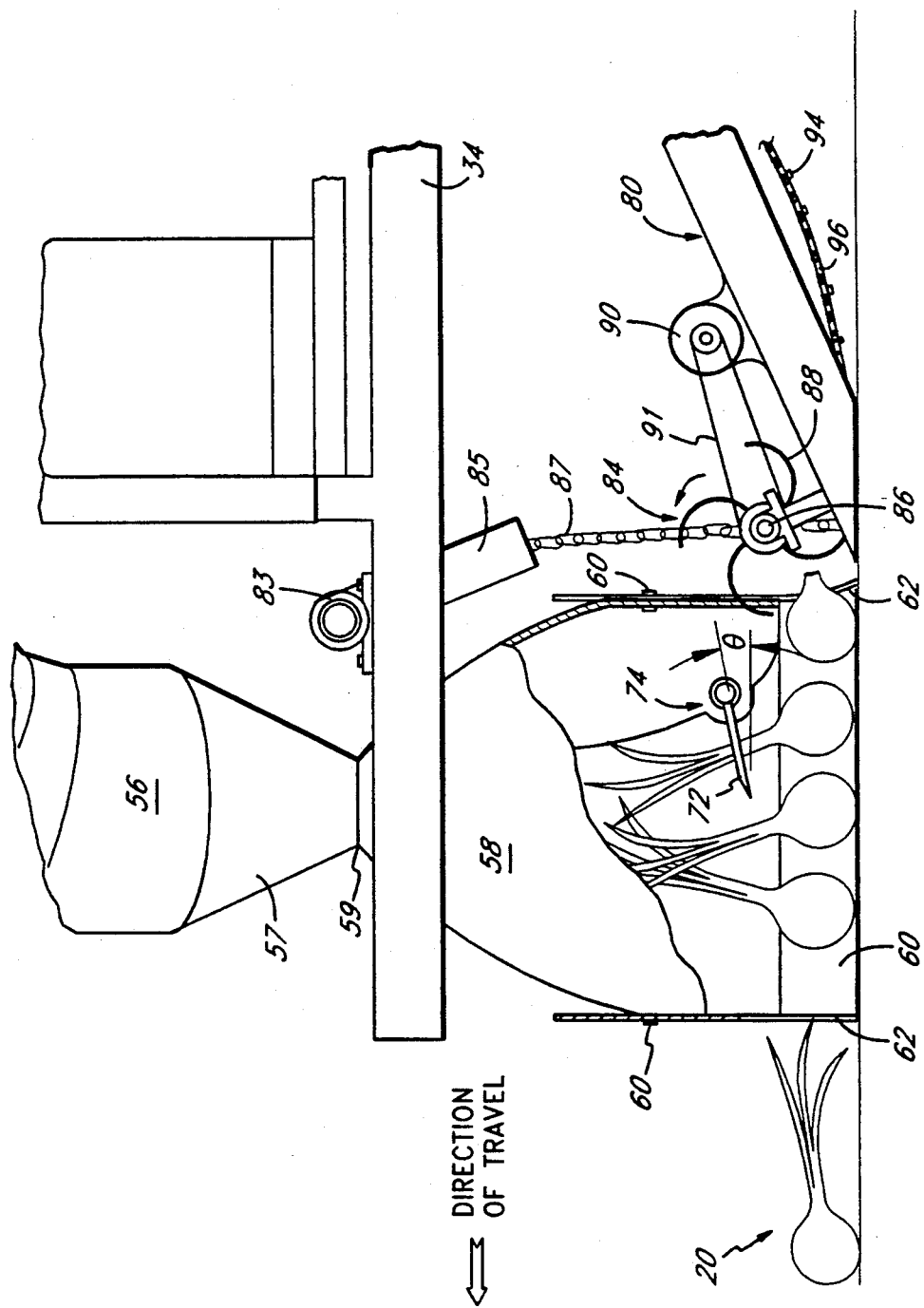
FIG. 7 is a side view of the angled sickle blade.
Figure 8:
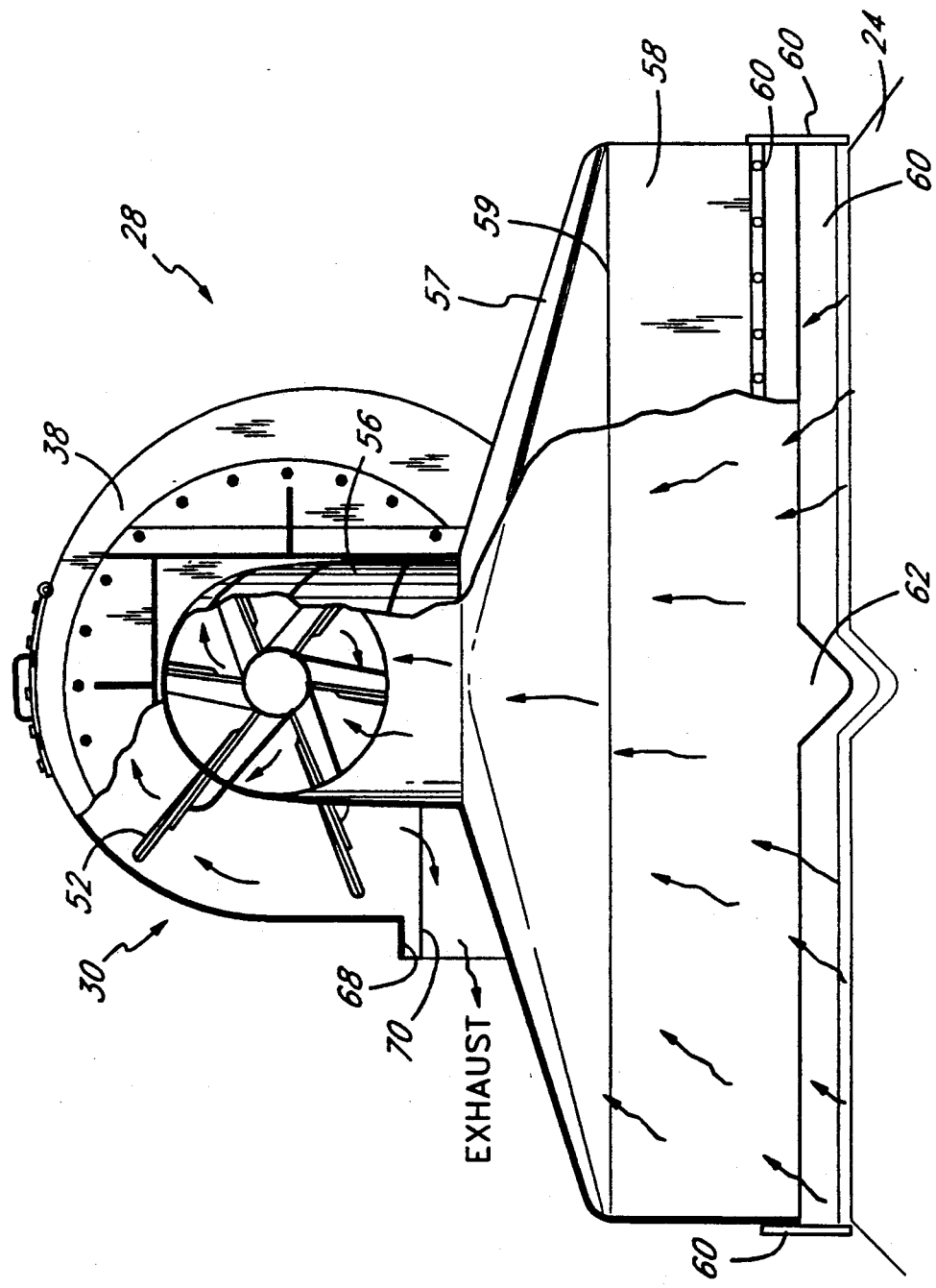
FIG. 8 is a front view of the vegetable topper showing the suction action.

Referring to FIGS. 1-4 and 7-8, the fan unit 38 is comprised of an outer cylindrical housing, or drum 54, within which a plurality fan blades 52 rotate (FIGS. 1 and 8). The centerline of the fan 38 and axis of rotation of the fan blades 52 are coincident with the axis of the horizontal drive shaft 40. While there is an inch or more clearance between the outer edges of the fan blades 52 and the adjacent housing, the rotation of the fan blades 52 within the drum 54 creates a powerful suction within the intake manifold 56 and vacuum hood 58. The construction of the fan blades, or paddles 52, relative to the housing, and the rotational speed of the fan blades, are such that the tops 22 of the onions are chopped into small pieces, few of which are larger than 1 or 2 inches long, and most of which are much smaller. If the tops 22 are dry, many of the particles exit as dust and small flakes. A blower built by Fan Engineering Co., Huntington Beach, Calif., size 0-21, type IE, has been found suitable for use as to fan unit 38, and the details of the construction of that fan unit are incorporated here by reference. This blower unit has a drum 54 about 5 feet in diameter, and 6 fan blades 52 that are about 12×16 inches in size. Advantageously, the fan blades 52 rotate at about 1,750 rpm when the topper 28 is traveling at about 3.5 mph, although the blades may rotate up to about 2,100 rpm in wet fields of green onions, and as low as about 1,200 rpm in very dry fields of onions.

The intake manifold 56 is generally cylindrical in cross section, about 22 inches in diameter, and extends centrally from the center of the flat front of the drum 54 before bending downwardly to contact the top of the vacuum hood 58. The vacuum hood 58 continues down from the intake manifold 56 to just above the ground. The vacuum hood 58 is fastened to the frame 34 for support.

As seen in FIGS. 1, 6, 7 and 8, transitional piece 57 connects the circular intake manifold 56 with rectangular shaped throat 59 (FIG. 8), which is about 5 inches wide and as long as topper 28 is wide (about 7 feet). The throat 59 is about 12 inches below the end of the circular intake manifold 56. From the throat 59, the vacuum hood 58 expands outward to a larger, concentric rectangular shaped hood which is about two feet wide and again extends across the width of the topper 28 (about seven feet) so as to encompass two beds 24. The transition piece 57, throat 59, and vacuum hood 58 expand the area of suction from the cross-sectional area of the intake manifold 56 to a generally rectangular region large enough to encompass a plurality of onion bed 24, while maintaining a relatively uniform suction sufficient to lift the tops 21 into a suitable cutting position. The hood 28 is wide enough to provide room to lift the tops 22 of the onions 20 and present a perpendicular cross section to the sickle blade 72.

A rubber skirt 60 extends down from the front, back and two sides of the vacuum hood 58 and provides a flexible interface between the vacuum system 30 and the ground. Advantageously, the rubber skirt 60 has a rounded semicircular flap 62 extending down in the middle of the portion on the front and back sides of the hood 58. This extension fits into the depression for tires between the two beds that the vegetable topper 28 is traversing. The rubber skirt 60 provides a flexible seal with the ground to adjust to varying terrain and enable suction within the hood 58 to be maintained. Advantageously, the skirt 60 is long enough to extend close to the ground during operation, and preferably either rests against the ground or is no more than about two inches above the ground. The back portion of the skirt 60 is advantageously set high enough so that is clears the onions 20, does not bruise them, and if the onions are loose on the ground, is high enough and flexible enough that it does not cause the onions 20 to roll along under the hood 58.

The front portion of the skirt on the front of the hood 58 is shorter, and advantageously ends about one inch above the onion bulbs 21. The skirt 60 is flexible enough to allow passage of the onions 20 without bruising them. Advantageously, the rubber skirt 60 is connected to the hood 58 in such a way that the position of the skirt relative to the hood 58, may be adjusted. Bolts extending through stalled holes in the skirt 60, are believed suitable for this adjustment capability.

The vacuum system thus provide means for exerting a substantially uniform suction across a plurality of beds 24 of onions 20. The construction is such that the suction is sufficient at the edges of the area under the hood 56 that the onion tops 22 are lifted into a position suitable for cutting.

Referring to FIGS. 1-5, the front of the frame 34, and the vacuum hood 58, may be raised up or down with a vacuum hood piston 64. The vacuum hood piston 64 is in fluid communication with, and powered by, the hydraulic pump 48 by means known in the art and not described in detail herein. The vacuum hood piston 64 is fixed between two lever arms 66a, 66b. Front lever arm 66a is rigidly fixed to the towing draw bar 112. Rear lever arm 66b is rigidly fixed to the front of the moveable frame 34. Several co-linear hinges 67, 67a, 67b are located at the juncture of the draw bar 112 and the front of the frame 34. The extension of the vacuum hood piston 64 causes the frame 34 and draw bar 112 to angle upward with respect to each other, with the hinges 67 as fulcrums. At the maximum extension of piston 64, the vacuum hood 58 is elevated up from the ground by extension of piston 64, the topping operation is disengaged, and tighter turns are possible. Smaller extensions of the piston 58 also allow adjustment of the height of the vacuum hood 58 relative to the ground.

Referring to FIGS. 1-5 and 7-8, as the vegetable topper 28 moves forward, the vacuum system 30 lifts the tops 22 of onions 20 and sickle blade 72 cuts them off. The vacuum is sufficiently strong that it will rotate onions 20 to enable the tops 22 to be cut, but the suction is not so great that it will lift the onion bulbs 21 into the cutting blade so as to damage the bulbs 21, unless the onion 20 are substantially smaller than the adjacent onions or unless the bulbs 21 are rotted, and thus light in weight than healthy onion 20.

The severed tops, and any other onions, are sucked up through the vacuum hood 58 and intake manifold 56 into the fan 38. The tops are cut, torn, or mulched by the rotary fan blades 52, and discharged out a rectangular exit port 68 in the side of the fan 38. The path traveled by the onion tops 22 through the vegetable topper 28 is generally shown in FIG. 8. The fan blades 52 are of such a construction that, when run at an appropriate speed for the type and density of plant tops entering the drum 54, the fan blades 52 cut, tear or chop the tops into a mulch. As the onion tops 22 are preferably dry when cut, most of the mulch will take the form of fine particles and dust which may extend in a dust cloud extending some 20 feet from the exit port 68 of the fan 38, thus spreading the tops 22 uniformly over a large area.

Early in the season, some fields of onions 20 may be harvested while the onions are less mature, and more green and moist than occurs later in the season as the tops 22 dry out. The moisture in these green tops combined with the small size of pieces into which the onion tops 22 are cut, promote clogging of the fan unit 38. Further, approximately 5-10% of the onion plants in the field are often seeders. When most onion tops 22 begin to wither and die, these seeders keep growing and present upright green and wet stalks to the vegetable topper 28. The small size into which the tops 22 are cut by the fan unit 38, and the moisture in these seeder stalks can also tend to promote clogging during the topping operation.

Advantageously, the bottom of the exit port 68 is covered with a non-stick liner 70 (FIG. 3), such as plastic, to which the wet tops 22 will not stick, in order to eliminate any clogging from the tops 22, particularly with wet crops. The bottom portion of the exit port 68 is important to prevent clogging if the onion tops are too wet, but additional benefit is obtained by fixing stick-resistant liners 70 on the sides of the exit port 68 with non-stick materials as well (FIG. 3). The lining may advantageously extend up the sidewalls of the drum 54 adjacent the exit port 68, but need not overlap much with the area immediately adjacent the sides of the rotating fan blades 52. Tests by a purchaser of one of an early prototype found that Teflon ® works well as a lining material.

Figure 2:
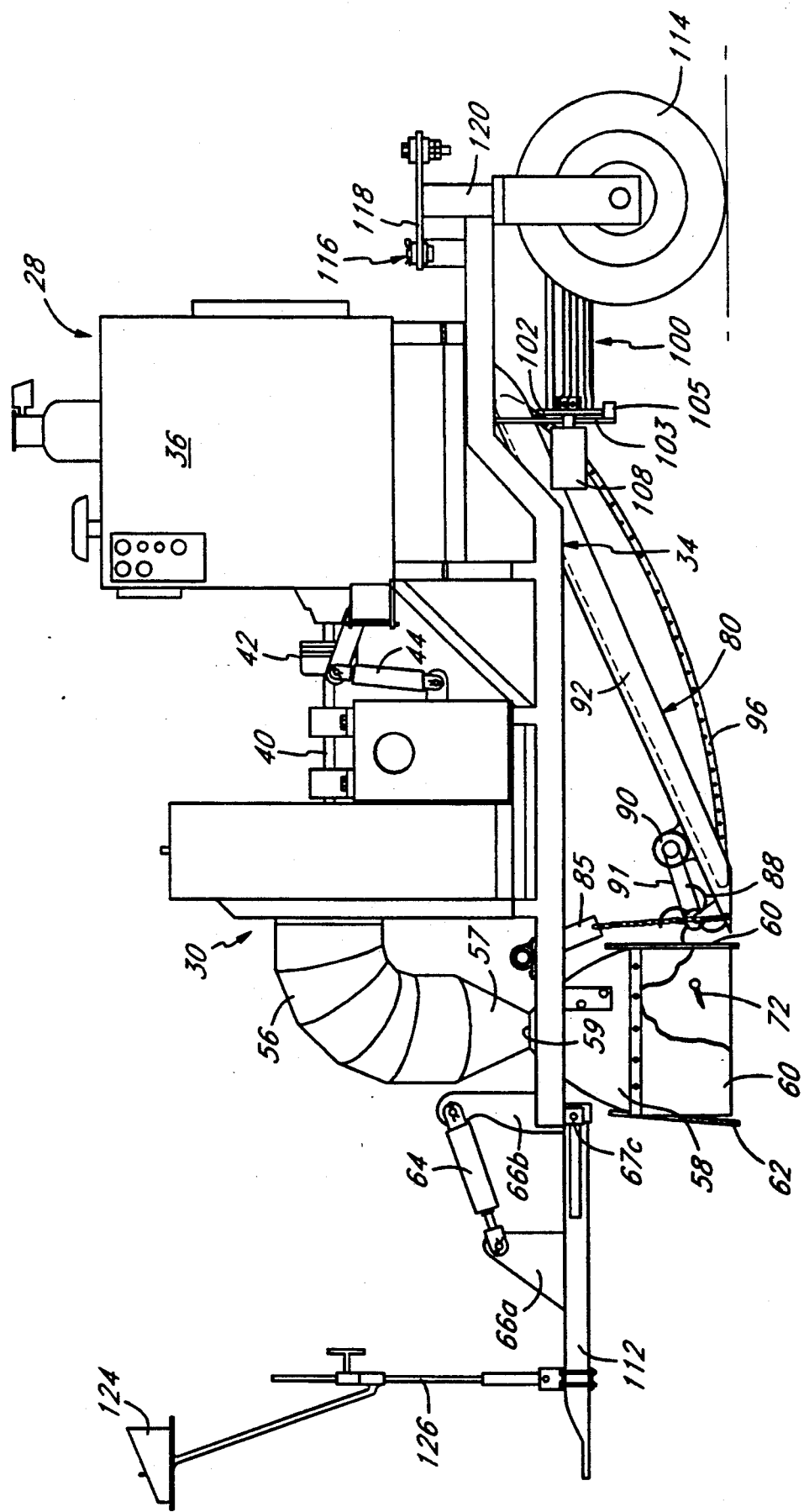
FIG. 2 is a right side view of the vegetable topper.
Figure 6:
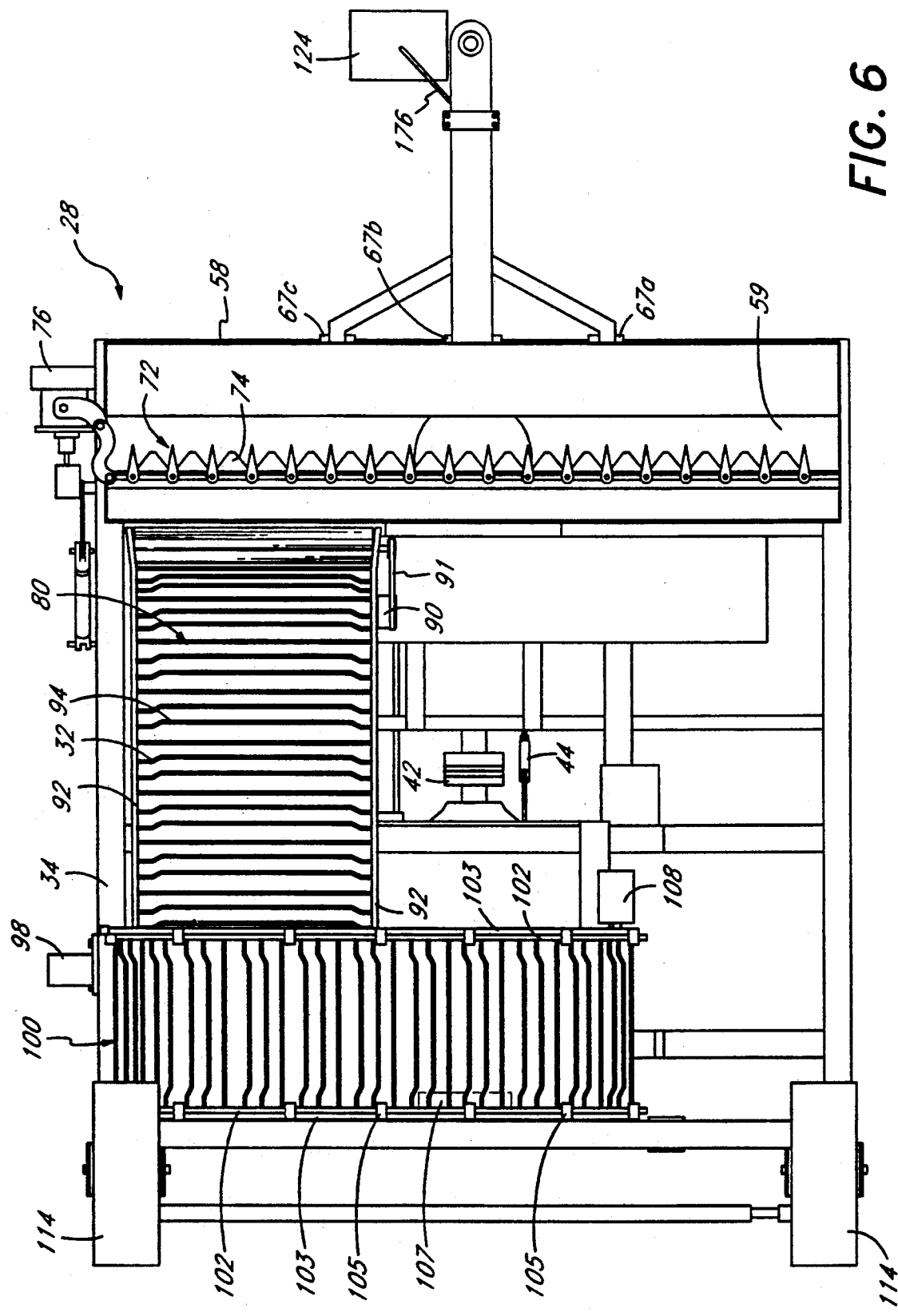
FIG. 6 is a bottom view of the vegetable topper.

As seen in FIGS. 2, 6 and 7, the sickle blade 72 is mounted inside the vacuum hood 58. The sickle blade 72 extends across the length of the vacuum hood 58. Abutting rows of teeth 74 face forward to come in contact with the raised onion tops 22. Advantageously, for cutting the tops of uprooted onions 20, the sickle blade 72 is disposed about five inches from the ground, inside the vacuum hood 58, and at or just a little behind the center of the manifold 56 and the center of throat 59. A hydraulic motor 76 is fixed to the frame 34 proximate one end of the sickle blade 72 (FIGS. 3 and 6).

The sickle actuating motor 76 causes one row of teeth 74 to slide transversely relative to the other, resulting in a dual shear or scissor-like action which cuts or snips off the tops 22 of the onions 20 between the blades 74. The sickle actuating motor 76 is in fluid communication with, and powered by, the hydraulic pump 48 by means known in the art and not described in detail herein. A 6-cubic inch displacement Vicars hydraulic motor with an 800 rpm average operating speed has been found suitable for the sickle actuating motor 76 when the vegetable topper 28 is moving at about 3.5 mph. The speed of the sickle may be varied by motor 76 to accommodate different speeds of topper 28, different maturity of onions 20, and varying amounts of seeders and wetness.

Advantageously, the sickle blade 72 is angled downward toward the ground, with the angle ($\theta$) depending on a number of factors, including the speed of the vegetable topper 28, the wetness of the tops 22, and the amount of suction from the vacuum system 30. The angle is advantageously selected so that when the onion tops 22 are sucked upwards, the tops 22 are cut substantially square to the onion 21 such that if the onion 21 and the top 22 were vertical, the cut would be horizontal. Advantageously, the blade 72 cuts the tops 21 when the tops 21 are at an angle to the ground, and before the tops 21 are vertical to the ground, but while the tops 21 are perpendicular to the blade 72.

The angle at which the sickle blade 72 cuts the onion tops affects efficiency of the topper and the quality of product. In general, the speed, suction and wetness of the tops 22 are such that the tops 22 are slightly tilted in the direction of forward motion of the vegetable topper 28 when cut. A fixed, horizontal blade cannot sever the tops 22 cleanly without positioning the sickle 72 so near the bulb 21 of the onion 20 that the sickle hits and damages the bulb. The angle of the cutting blade 72 also helps raise the rear of the sickle 72 to allow cutting close to the bulb 21 while not hitting the bulb. Advantageously, the angle $\theta$ of the sickle blade 72 may be varied between 5° and 15° from horizontal to optimize cutting efficiency. Tests of a prototype indicated an angle of about 11-12° is advantageous in a dry field at about 3 to 3.5 mph and about 5-10% seeders.

The vegetable topper 28 is designed to consolidate a number of rows 26 of topped onions 20 into a portion of the original area. Commonly, two beds are merged into one, but, depending on the size of the equipment and the size of the beds, combining two rows into one, combining four rows into two, or perhaps more, are possible. The merging is accomplished by a conveyor system 32. Referring to FIGS. 1-5 and 7-8, the conveyor system 32 comprises an inclined pick-up conveyor 80 and accompanying flapper 84 (FIGS. 2-3), and a rear-cross conveyor 100. The pick-up conveyor 80 has a width about equal to half the width of the moveable frame 34, or about the width of one bed 24. The pick-up conveyor 80 depends from one side of the frame 34, directly behind the vacuum hood 58. The conveyor 80 has a length which extends from just behind the vacuum hood 58 rearward to the cross conveyor 100.

The front end of the pick-up conveyor 80 is vertically adjustable with a pick-up lift piston 82 to control ground clearance. The piston 82 is connected to a lever 81 that is rigidly connected to one end of rotatable shaft 83. Shaft 83 extends across the width of frame 34, and is rotatably connected to opposite sides of the frame. A tang 85 extends radially from shaft 83, with a flexible connector, such as chain 87, connecting the distal end of the tang 85 to the front end of the pick-up conveyor 80. As the piston 82 extends, it causes lever 81 to rotate shaft 83, which moves tang 85 to cause the chain 87 to raise or lower the front end of pickup conveyor 80, depending on the motion of piston 82. The pick-up lift piston 82 is in fluid communication with, and powered by, the hydraulic pump 48 by means known in the art and not described in detail herein. When engaged, the front of the conveyor 80 is proximate the ground just behind the vacuum hood 58.

Advantageously, when the front end of conveyor 80 is adjacent the ground, it is at an angle of about 20° relative to the ground, so as to minimize bruising of the onions 20. A 17-cubic inch Ross torque motor has been found suitable for driving the pick-up conveyor 80.

The rear of the conveyor 80 is rotatably mounted to the rear of the frame 34 by means known in the art and not described in detail herein. The pick-up conveyor 80 comprises two pick-up sidewalls 92 and a plurality of transversely spaced pick-up ribs 94. The pick-up sidewalls 92 are generally vertically oriented sheet metal strips mounted along the outer length of both sides of the pick-up conveyor 80 with a height above the pick-up ribs 94 approximately equal to the maximum diameter of onion bulb 21. The pick-up sidewalls 92 comprise side borders for the pick-up conveyor 80 to prevent the onions from falling off the pick-up conveyor 80.

The pick-up ribs 94 are thin metal rods extending transversely across the pick-up conveyor 80, and are located between the pick-up sidewalls 92. A plurality of pick-up ribs 94, evenly spaced and connected on both ends in a loop fashion, comprise the belt of the pick-up conveyor 80. The pick-up ribs 94 are connected on the ends to an endless pick-up drive chain 96, or belt, which is coupled with, and rotated by, a pick-up actuating motor 98. Two out of every three pick-up ribs 94 have a middle portion that is bent downward. Stated another way, the pick-up ribs have lowered midsections for the onion bulbs 21 to ride in. Each third pick-up rib 94 extends horizontally straight across the pick-up sidewalls without bending. The straight third ribs 94 serve to push the onions up the inclined pick-up conveyor 80, without bruising the bulbs 21. The pick-up actuating motor 98 (FIG. 3) is in fluid communication with, and powered by, the hydraulic pump 48 by means known in the art and not described in detail herein. A 17-cubic inch Ross torque motor has been found suitable for driving the pickup conveyor 80. The speed of the conveyor 80 may be adjusted by varying the speed of motor 98, in order to accommodate more or less onions. As shown in FIG. 5, the sickle actuating motor 76 and pick-up conveyor motor 98 are connected in series, with adjustable needle valve 77 allowing the speed of motors 76, 98 to be varied according to the speed of topper 28, density and wetness of top 22, and amount of suction from vacuum system 30.

The rotating flapper 84 is located just in front of the front end of the pick-up conveyor 80. Chain drive 91 couples a gear on the end of axle 86 to a drive gear on motor 90 mounted to one sidewall 92 to rotate the flapper 84 through a 1.5 gear reduction. The flapper 84 comprises a flapper axle 86 and a plurality of rectangular rubber flaps or flexible cross flights 88 mounted on the axle 86. The flapper axle 86 is oriented transversely across, and rotatably mounted to, the front of the pick-up conveyor 80. The flaps 88 are about the same length as the axle 86, extend radially from the axle 86, and are wide enough and stiff enough to move the onion bulbs 21 onto the conveyor 80. The flapper 84 is driven by flapper actuating motor 90 mounted to the front of the pick-up conveyor 80. The flapper actuating motor 90 is in fluid communication with, and powered by, the hydraulic pump 48, by means known in the art and not described in detail herein. A flapper actuating motor 90 comprising a 6-cubic inch displacement Vicars hydraulic motor with an 800 rpm average operating speed has been found suitable. The rotational speed of the flapper 84 can be varied by adjusting the speed of motor 90, to accommodate differing speeds of topper 28.

The flaps or cross flights 88, described above, lift the topped onions 20 up onto the front of the pick-up conveyor 80. The onion bulbs 21 ride up the pick-up conveyor 80 and are deposited onto rear-cross conveyor 100, located toward the rear of the vegetable topper 28 and below the rear end of pickup conveyor 80. The rear-cross conveyor 100 is located underneath and across most of the width of, the rear end of the moveable frame 34. The rear-cross conveyor 100 extends transversely from one side of the moveable frame 34 towards the other side.

Referring to FIGS. 2-4 and 8, the upper end of the pick-up conveyor 80 overlaps a portion of the front side of the rear-cross conveyor 100, and the onion bulbs 21 are transferred to the rear-cross conveyor at this junction. The other end of conveyor 100 preferably extends to a position above the middle of the adjacent onion bed 24 so that the onion bulbs 21 are then deposited by the conveyor 100 over the bed 24 of onions 20 left on the ground. The final drop location of the onions may be adjusted by moving the position of the entire cross-conveyor 100 with the rear-cross adjustment motor 101. The cross-conveyor 100 allows two beds 24 of onions 20 to be combined into one bed for easier pickup. As many farmers do not have multi-bed pickup equipment, this feature is very helpful. As only one bed 24 of onions 20 are moved, the handling of the onions 20 is minimized, thus reducing the risk of bruising the onions 20.

Similar in configuration to the pick-up conveyor 80, the rear-cross conveyor 100 includes two rear-cross side walls 102 and a plurality of rear-cross ribs 104 connected by a rear-cross drive chain 106. The rear-cross side walls 102, ribs 104 and drive chain 106 have similar structures as the pick-up side walls 92, ribs 94 and drive chain 96, described above.

The rear-cross ribs 104 are rotated by a rear-cross actuating motor 108 via the rear-cross drive chain 106, or belt. The rear-cross actuating motor 108 is connected to, and powered by, the hydraulic pump 48 by means known in the art and not described in detail herein. A rear-cross actuating motor 108 comprising a 6-cubic inch displacement Ross hydraulic motor with an 800 rpm average operating speed has been found suitable. The speed of cross-conveyor 100 may be adjusted by varying the speed of motor 108, to accommodate the transfer of more or fewer onions 20. The motor 108 is connected to, and powered by, the hydraulic pump 48 by means known in the art and not described in detail herein. As shown in FIG. 5, the motor 108 and flapper motor 90 are connected in series so their speeds may be simultaneously adjusted by needle valve 99. Thus, as with the series connection of the sickle motor 76 and pick-up motor 98, two cooperative components are powered such that their operating speed may be simultaneously varied.

The conveyor 100 is mounted to the frame 34 such that the position of conveyor 100 can be moved relative to frame 34 and topper 28. Two support rails 103 are rigidly connected, and depend from the frame 34, the side walls 102 of cross-conveyor 100 are aligned with and slidably mounted on, lateral support 105 which extend laterally from the rails 103. Thus, the entire conveyor 100 may move relative to the frame 34. A hydraulic piston 107 has one end connected to one of the stationary support rails 103, and the opposing end connected to one of the moveable or slidable sidewalls 102 of cross-conveyor 100. The piston 107 is in fluid communication with hydraulic pump 46. As the hydraulic system 46 causes the piston 107 to expand, the conveyor 100 is moved laterally across the frame 34 of onion topper 28, in order to position the location at which onions 20 leave the conveyor 100. While the location at which the onions 20 are deposited is advantageously above the adjacent bed 24, the location could be outside the topper 28, or on the next adjacent bed 24.

Figure 4:
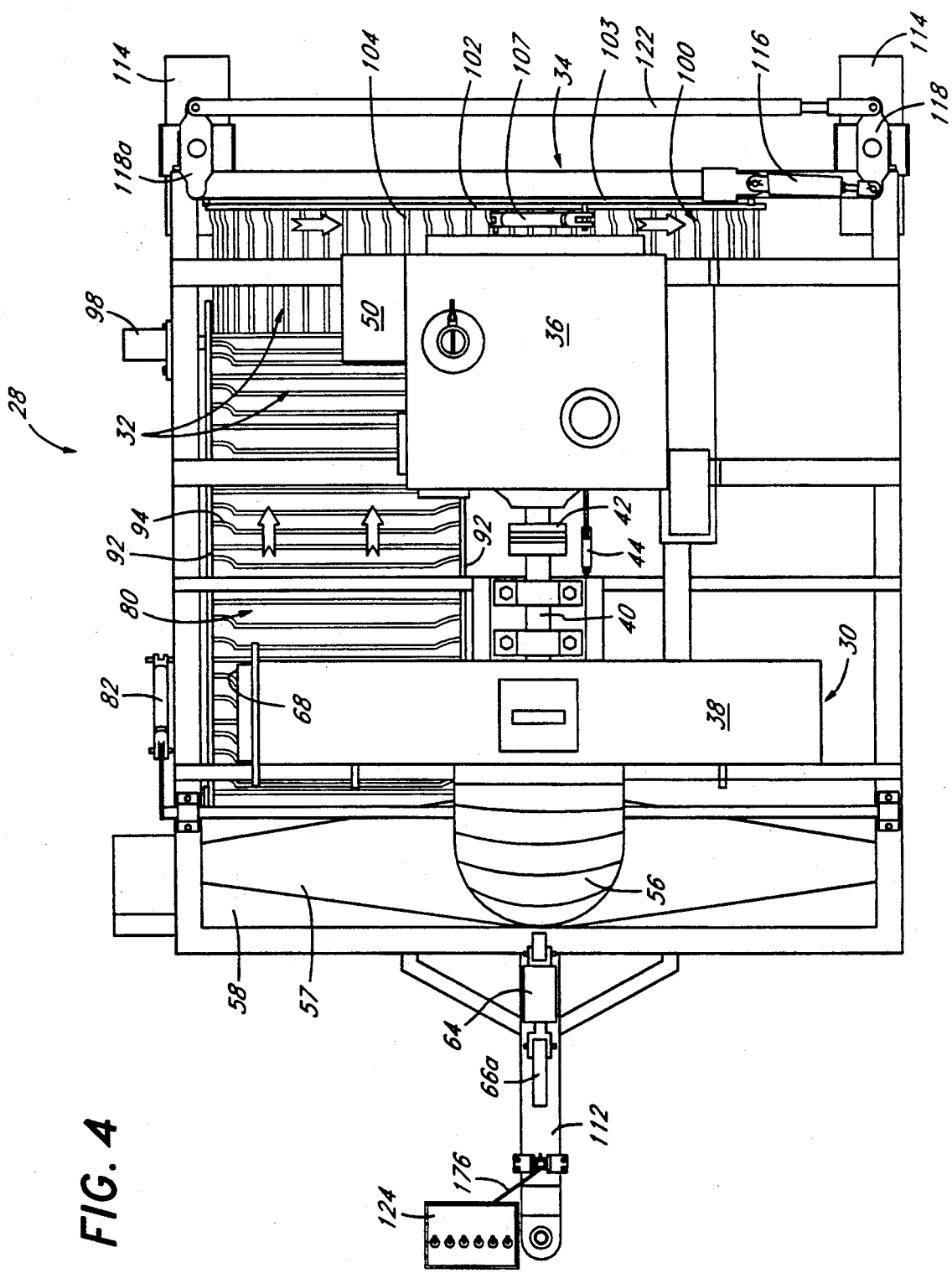
FIG. 4 is a top view of the vegetable topper.

The aforementioned components are connected to the wheeled, moveable frame 34. The structural portion of the frame 34 comprises a chassis, preferably made of rectangular steel tubing for strength and durability. The draw bar 112 extends generally horizontally from the center of the front end of the chassis 110 to allow the vegetable topper 28 to be pulled by a hitch behind a tractor (not shown). Two steerable wheels 114 are rotatably mounted at the rear corners of the frame 34. The wheels 114 are controllably turned with a steering piston 116 (FIG. 4). Steering piston 116 is mounted to the frame to the rear of the primary motor 36. The steering piston 116 is connected to, and powered by, the hydraulic pump 48 by means known in the art and not described in detail herein. The steering piston 116 rotates steering arms 118 which has as its pivot a vertical strut 120 of one wheel 114. A second steering arm 118a, which has the vertical strut 120 of the opposite wheel 114 as its pivot, moves in tandem with the first steering arm due to the action of a connecting rod 122 which extends between, and coordinates the motion of, steering arms 118, 118a. The vegetable topper 28 can make extremely tight turns due to the simultaneous positioning of the wheels 114 by piston 116, and can make even tighter turns if the front end is lifted by piston 64.

A schematic of the hydraulic system 46 is shown in FIG. 5. The pump 48 and reservoir 50 are rigidly mounted to the primary motor 36, while the hydraulic lines 51 and various actuating motors and pistons are mounted and connected, as depicted in the drawings and as previously described. Advantageously, there are two pressure lines from each valve 53 to the corresponding piston 44, 64, 82, 107 or 116, although for simplicity only one line is depicted. The valves 53 are remotely controlled through control panel 124 by means known in the art and not described in detail herein. The valves 53 allow the operational speed of various pistons to be remotely controlled, depending on the speed of vegetable topper 28, and the wetness and density of seeders and onions 20, and the suction from fan unit 38. The ability to control the speed of the conveyors 80, 100 and pick-up flapper 84 through valves 77, 99 in order, to accommodate the speed of the onion topper 28 enables minimizing the bruises to the onions 20.

As seen in FIGS. 1 and 5, elements of the hydraulic system 46 and its hydraulic parts are controlled from a central electrical switch box 124.

An adjustable support structure 126, 126a is mounted to the draw bar 112 at the front of the frame 34. The lower arm 126 extends vertically while the upper arm 126a is slidably attached to the lower arm 126 and angles forward to terminate in a mount for an electrical switch box 124. The support arms 126, 126a are hollow and contain the wires connecting the switch box 124 with the valves 53 which control the hydraulic piston system 46. The support structure 126, 126a is constructed so that the switch box 124 can be adjusted to be within reach of a person operating a tractor that is hitched to the vegetable topper 28. This position allows the operator to alter the cutting action of the vegetable topper 28 from the tractor while in motion. The electrical connection between the switch box 114 and the valves to control the hydraulic system 46 are known in the art or readily ascertainable once the above-described components are known, and these electrical connection are thus not described in detail herein. While the pistons are shown connected to electric shut off valves 125, similar electric solenoid shut off valves could be connected to motors 76, 90, 98 or 108.

The engagable clutch 42 and pickup piston 82 allow the vacuum system 30 to be run separately from the conveyor system 32. Thus, the pickup conveyor 80 may be raised, and flapper 84 and the rear conveyor 100 may be disengaged, so the topper 28 can be used only to top onions 20, or to make a first pass followed by a second pass during which the onions 20 are again topped and then picked up. Alternately, the vacuum system 30 can be disengaged, while the conveyor system 32 combines two beds 24 of onions 20 into one bed 24. The cutter bar 72 can also be raised by piston 82, while the piston 82 adjusts the position of pickup conveyor 80 to pick up onions 20 to ensure no further cutting of the onions.

In an alternate embodiment, shown in FIGS. 9-14, a vegetable topper 150 draws mechanical power from a power take-off (PTO) assembly at the rear of the tractor (not shown), and the topping operation is simplified. A PTO shaft (also not shown) extending generally horizontally from the rear of the tractor, and turned by the tractor motor, couples to a shaft 152 on which an 8-sheave pulley 154 and a single sheave pulley 156 are mounted and keyed. The shaft 152 is rotatably mounted on a support frame 151 of the topper 150. The PTO and coupling mechanism are known in the art and will not be described further herein. The topper is connected to the tractor by a three-point pickup, which is known in the art, adaptable once the following structure is known, and is not described in detail herein. The only power driven parts in this embodiment are the fan blades 166 and the sickle blade 160.

The topping operation of the alternate embodiment as shown does not include a conveyor system 32, as described above for the first embodiment, for consolidating topped onions. However, it is contemplated that this conveyor feature may be added as an option in later designs. The vegetable topper 150 also does not include a hydraulic system 46, as described above for the first embodiment, to power various motors and pistons. It is contemplated that a hydraulic power system may be added.

Except for the drive connection, a vacuum system 162 of the alternate embodiment comprises similar features as the vacuum system 30 of the first embodiment. An 8-sheave pulley 168 is disposed at the front of the vegetable topper 150 and has an axis of rotation parallel to the longitudinal axis of the topper 150. The pulley 168 is mounted and keyed to a fan shaft 164 which drives the fan blades 166 of the vacuum system 162. The pulley 168 is connected to and derives power from the 8-sheave pulley 154 driven by the PTO. Eight flexible belts 165 provide the rotational coupling between the two 8-sheave pulleys 154, 168. The fan shaft 164 drives the fan blades 166 from the front, and therefore a fan drum 170, analogous to fan drum 54 of the primary embodiment, is oriented opposite the first embodiment, yet with the axis of blade rotation similarly along the longitudinal axis of the topper 150.

A intake manifold 172, with a circular cross-section, extends rearward from the fan drum 170 and bends down to contact an adaptor 173. The adaptor 173 simultaneously widens and alters the cross-section of the intake area. The lower end of the adaptor 173 has a rectangular cross-section with a length spanning the width of the vegetable topper 150, and a width, or front-to-rear dimension, slightly smaller than the diameter of the original circular cross-section at the top of the adaptor 173. The bottom of the adaptor 173 abuts the top of a vacuum hood 174. The vacuum hood 174, extends downward from the adaptor 173 to the ground. The downward facing aperture defined by the lower edge of the vacuum hood 174 is disposed at the rear of the support frame 151. The vacuum hood 174 has a rectangular cross-section with a width, or front-to-rear dimension, which constantly widens from the adaptor 173 to the ground, and a constant length spanning the width of the topper 150. A rubber skirt 176 extends down from the rear, front and two sides of the lower edge of the vacuum hood 174. Fan blades 166 rotate inside drum 170 to create a powerful suction within the intake manifold 172 and vacuum hood 174. The structure of the fan drum 170, intake manifold 172, vacuum hood 174, rubber skirt 176 and fan blades 166 are substantially similar to the analogous components of the first embodiment.

Inside, and disposed at the rear of, the vacuum hood 174 is a sickle blade 160 located approximately 5 inches above the ground. The sickle blade 160 is mounted to the frame 15 horizontally across the width of the inside of the vacuum hood 174. The angle of the sickle blade 160 may be adjusted manually to better meet the oncoming onion tops at a perpendicular angle. The structure, and subsequent cutting action, of the sickle blade 160 is similar to that of the sickle blade 72 of the first embodiment, where one row of teeth is caused to slide transversely relative to the other, resulting in a scissor-like action. However, the power to actuate the sickle blade 160 derives from the PTO via a belt-pulley system. The single sheave pulley 156 keyed to the drive shaft 152 turns a first belt 178. The first belt 178 is in the vertical transverse plane and extends around the sheave 156 to drive a first pulley 180 on a gear box 182 mounted to the front corner of the frame 151 of the vegetable topper 150. The gear box 182 has an internal mechanism which changes the axis of rotation of two external pulleys 90 degrees. Such internal mechanisms are well known in the art and will not be described further herein. The gear box 182 has a second pulley 184, oriented in the vertical longitudinal plane, directly coupled to the first pulley. A second belt 186 extends around the second pulley 184 to a pulley 187 integral to the sickle blade actuating mechanism 188. The actuating mechanism 188 converts the rotational motion of the pulley 187 into the reciprocating transverse sliding motion of the sickle blade 160.

As the vegetable topper 150 traverses a field of onions, the tops are suctioned upward inside the vacuum hood 174 and sheared off with the oncoming sickle blade 160 at a preferred angle. The angle may be manually adjusted based on the topper 150 ground speed, the density and wetness of onion crop, and the amount of suction. The topped onions, unlike the first embodiment, which consolidates the topped onions, are left on the ground in their original positions as there is no pickup conveyor. The onions 20 may be in the ground, or broken free by a breaker bar. The onion tops and any rotten onions are again mulched by the blades 166 in the fan drum 170, and expelled as a stream of small particles and dust out the side of the drum 170 through an exit duct 190. As in the first embodiment, a suitable non-stick liner 192 on the inside bottom, and optionally on lower portions of the inside sidewalls of fan drum 170, facilitates the expulsion of the mulched tops and prevents clogging. Tests by a purchaser of one of a prototype machine found that Teflon ® works well as a lining material.

Figure 9:
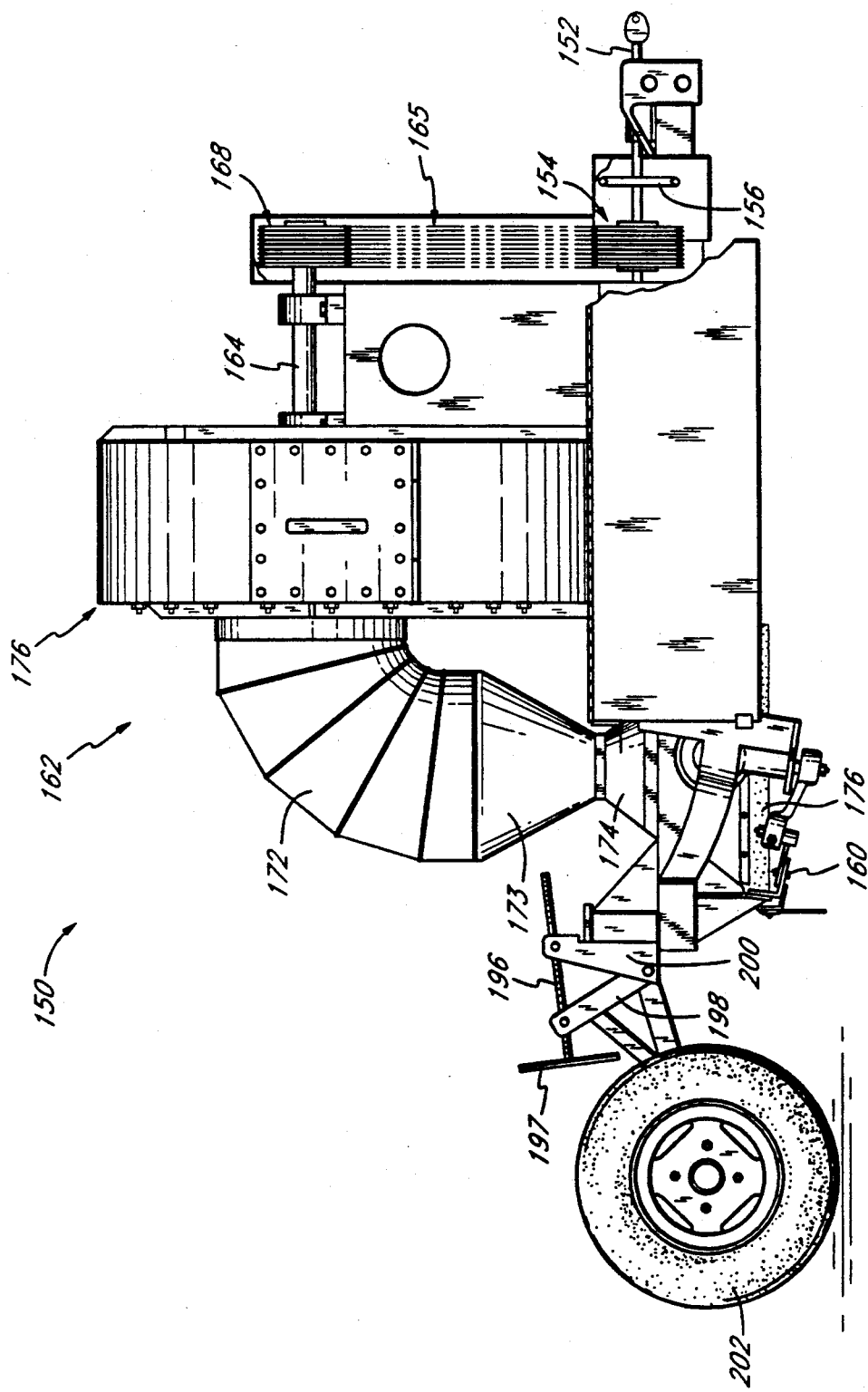
FIG. 9 is a right side view of an alternate embodiment of the vegetable topper.
Figure 10:
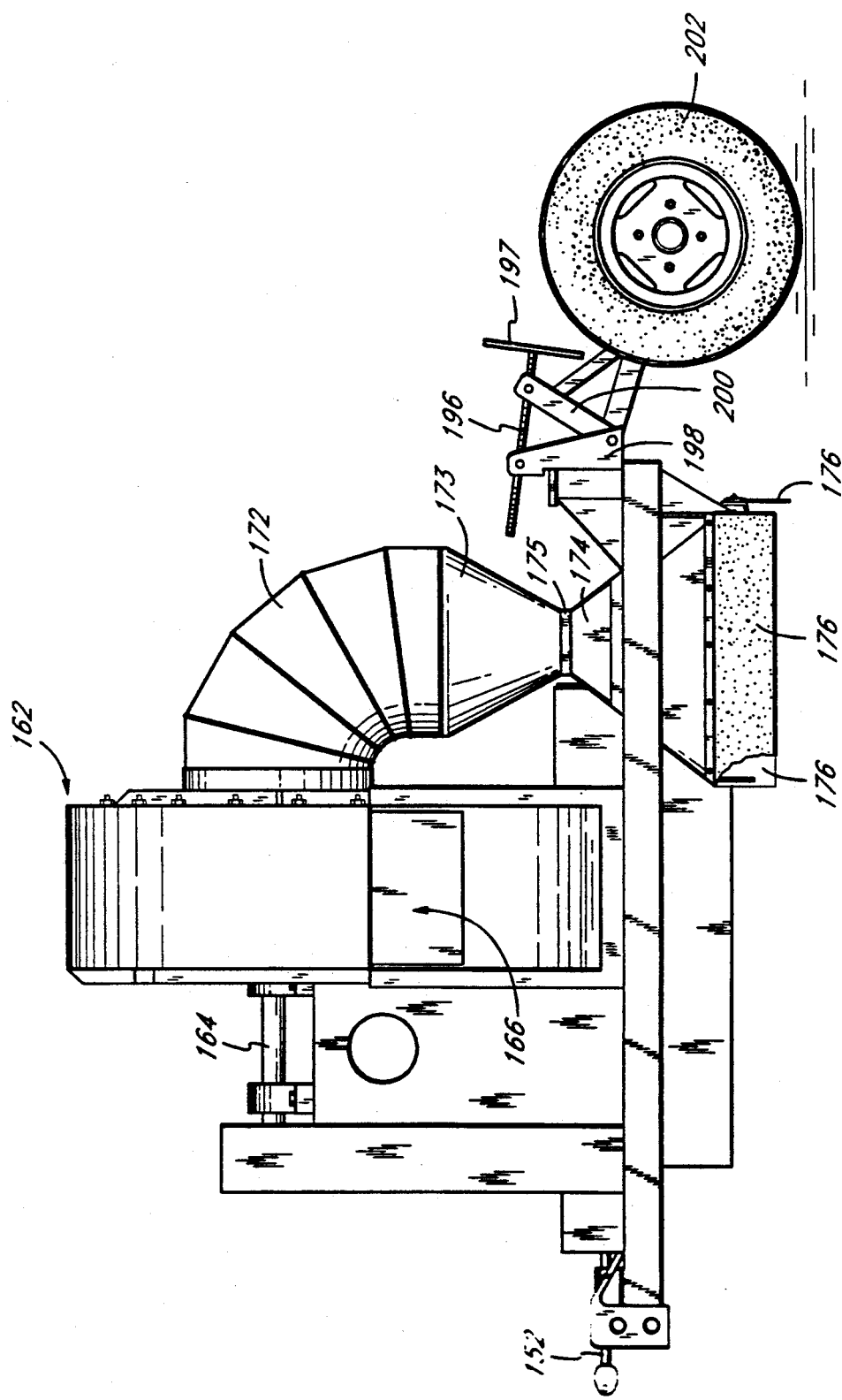
FIG. 10 is a left side view of the vegetable topper of FIG. 9.
Figure 11:
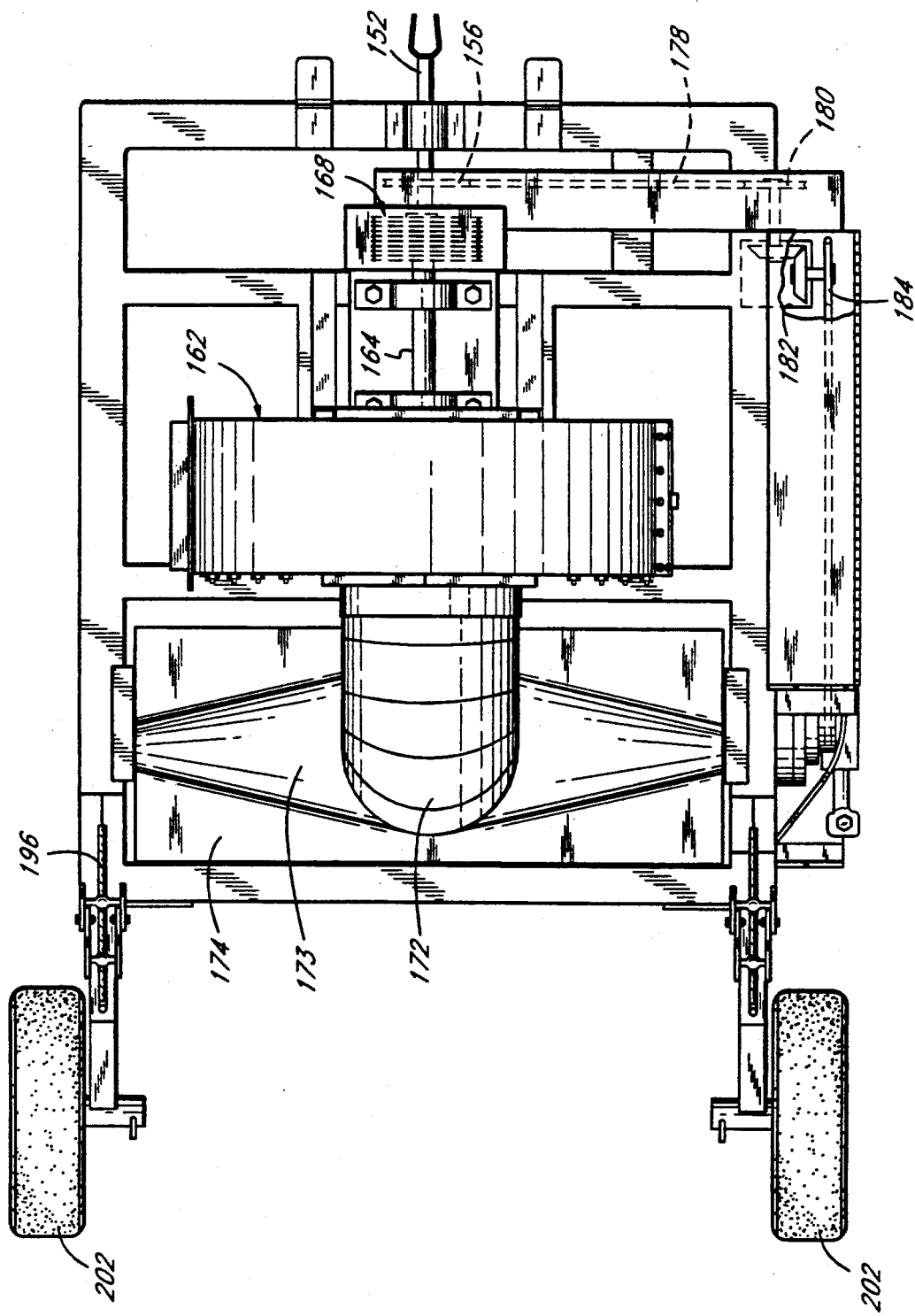
FIG. 11 is a top view of the vegetable topper of FIG. 9.
Figure 12:
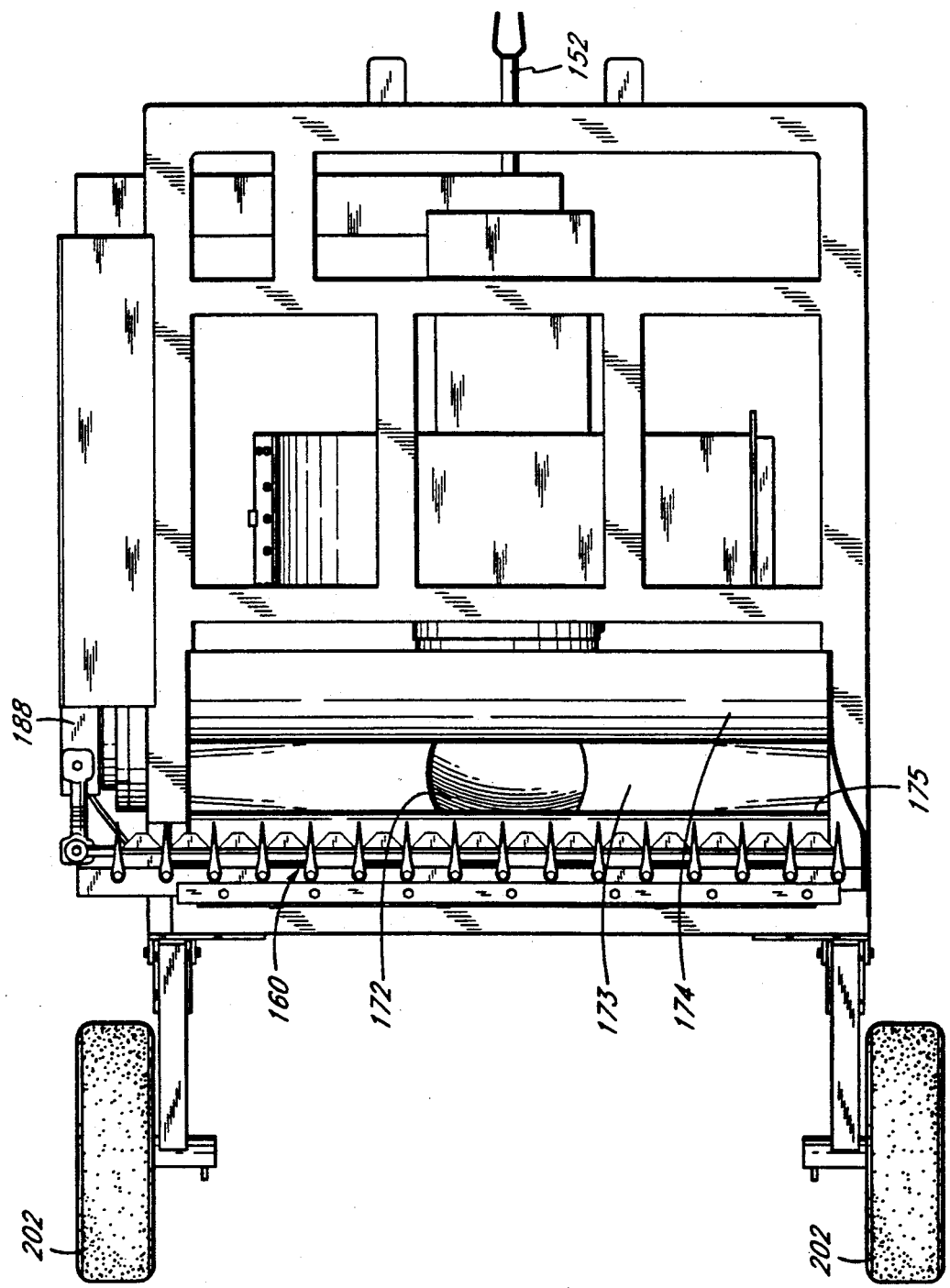
FIG. 12 is a bottom view of the vegetable topper of FIG. 9.
Figure 13:
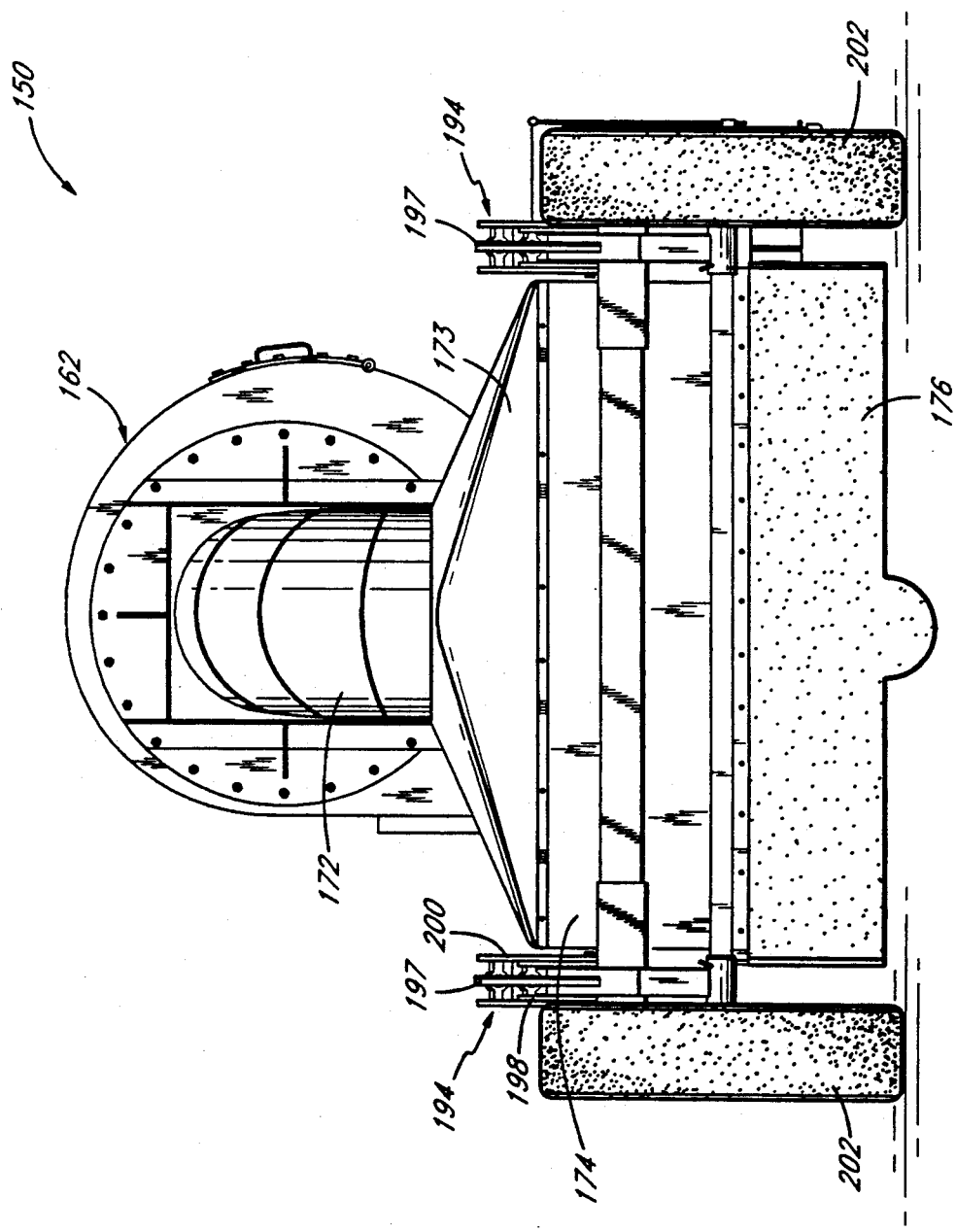
FIG. 13 is a front view of the vegetable topper of FIG. 9.
Figure 14:
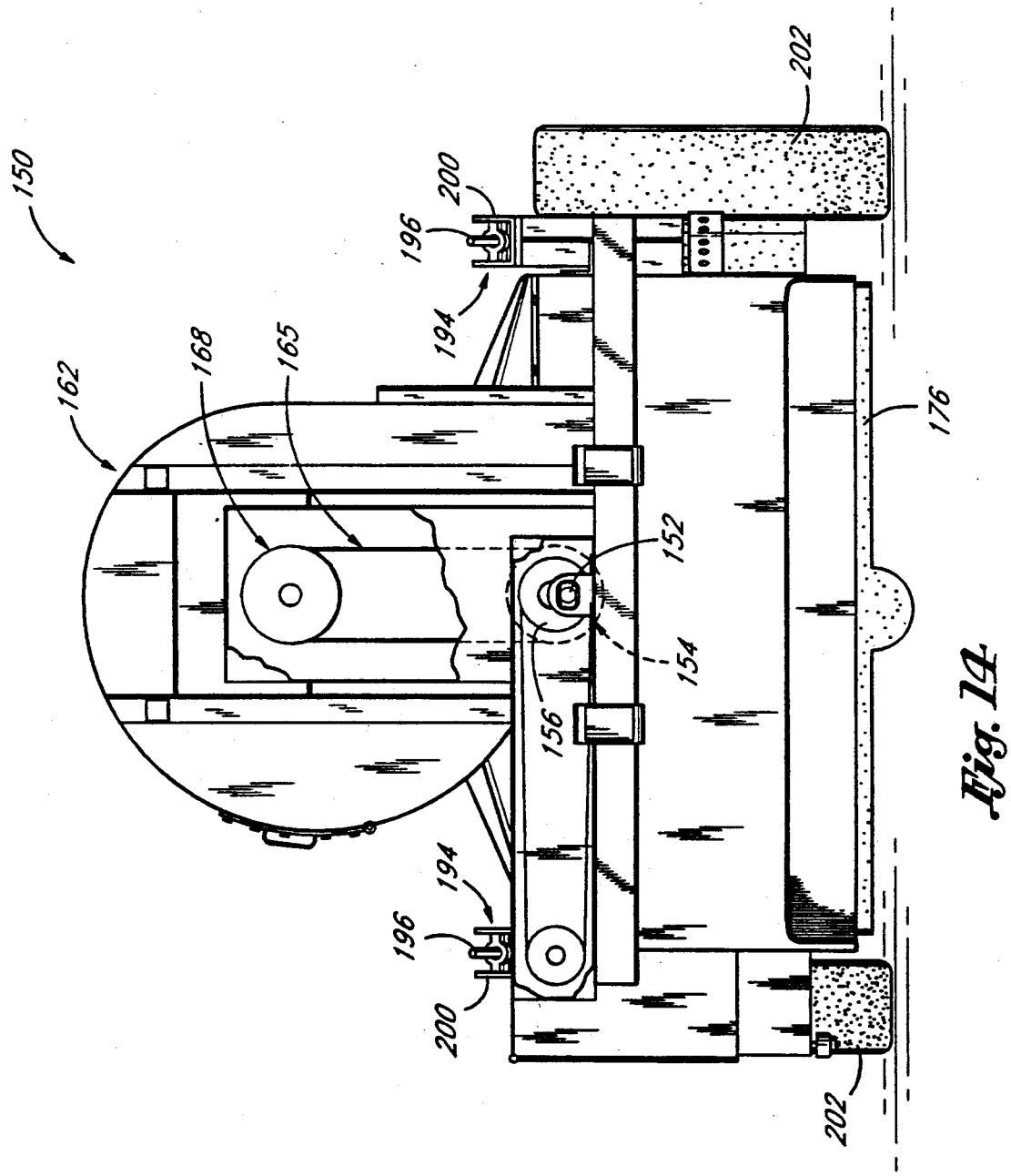
FIG. 14 is a rear view of the vegetable topper of FIG. 9.

Two manual height adjusters 194 for the Vacuum hood 174 are mounted at the rear corners of the frame 151. As seen in FIG. 9-10, the adjusters 194 comprise simple screw type mechanical jacks which are manually operated. A long threaded rod 196, with a handle 197 for torquing, connects the top ends of two lever arms 198, 200 on each adjuster 194. The lever arms 198, 200 each have internally threaded apertures at their top ends to receive the threaded rod 196. A frame lever arm 198 is rigidly fixed to the rear of the frame 151, while a wheel lever arm 200 is rigidly fixed to the axle of a wheel 202 that supports the topper 150 at each of the two rear corners of frame 151. The two lever arms 198, 200 are hingedly coupled at their lower ends to form an upright V shape with a hinge at the bottom. In practice, the threaded rod 196 may be turned to separate the upper ends of the lever arms 198, 200 and raise or lower the rear of the topper 150 and vacuum hood 174.

A John Deere tractor of about 100 horsepower, providing about 1,000 rpm at the PTO, when traveling at about 3 mph and about 16-1,800 rpm is believed suitable for pulling and powering vegetable topper 150. That would provide about 1,700 rpm for the fan blades 166.

Per USDA marketing orders, the top grade of onions have stalks or tops that are no longer than three inches on 80% of the onions. The equipment of the present invention can produce 90% of the onion with tops under three inches, at speeds of 3.5 mph and greater. Referring to both embodiments, the shearing type of cut afforded by the sickle blade 72, 160 of the vegetable toppers 28, 150 more cleanly severs a larger percentage of upright stalks than rotary blades. Rotary blades tend to rip or just bruise some stalks, especially when dull. Additionally, the sickle blades 72, 160 can be tilted to better meet the oncoming stalks at more efficient angles for cutting the onion tops without damaging the onions 20. An angle generally perpendicular to the extended onion stalk 22 is believed preferable for efficient cutting. The angle adjustment can be done by the operation of the sickle tilting mechanism 78 with a similar mechanism being used on vegetable topper 150. An angle of 11-12° is believed preferable for a speed of about 3 mph for the onion topper 28, with piston 64 providing a readily adjustable means for varying the height, and to a lesser extent the angle, of the cutting means 72, while the 3-point pickup connection of topper 150 to the tractor provides a similar function for that topper.

The fan units 38, 178 are commercially available, making them less expensive than a custom model and also relatively easy to service or replace. A 6-blade fan, 0-21 type, 1E sized, sold by Fan Engineering Company, Inc. of Huntington Beach, Calif., have been found suitable with the fan speed being as high as 2,200 rpm in wet, green onion fields, and as low as 1,400 rpm in very dry onion fields. Complete mulching of dry onion tops, have been demonstrated in field operations. The resulting dust and particle stream exiting from the fan unit 38 is flung to the side over a wide area in fine particles which do not obstruct access to the previously topped, or untopped, onions with the heavy matter and plant tops as with prior devices, thus enabling subsequent harvesting and topping of onions even if covered by the mulch. The mulch degrades fast, and returns valuable nutrients to the soil for the next crop. The disposal of the tops 22 in the fields eliminates the environmental problems associated with disposing of large quantities of onion tops accumulated at packing facilities.

The suction from fan unit 38 is advantageously sufficiently strong so that it can pick up onions which have neck rot or plate rot and are thus lighter than uninfected onions. The lighter, rotted onions are chopped up by the cutter blades 72, 160 and fan blades 52, 166, thus preventing spreading of the rot to other onions during shipment and storage, and making quality inspection easier. The suction will also pick up and mulch any onions 20 which are sufficiently undersized compared to other onions, which also makes sorting and grading of the onions easier.

The pick-up conveyor 80, directly behind the vacuum hood 58, picks the topped onions 20 up from half the bed 24 being passed over by the topper 28. The onions 20 are conveyed to the rear of the machine and deposited on cross-conveyor, which moves them over the adjacent bed 24 and distributes them over the onions 20 still on the ground. This reduces the subsequent gathering time. The ability to move the cross-conveyor 100 allows the position of the combined rows to be varied, and would allow the onions 20 from the first bed to be deposited completely to either side of the topper 28 rather than on top of the immediately adjacent bed of onions. The adjustment of the speed of the cutter bar 72, 160, conveyors 80, 100 and flapper 84, allow the onions 20 to be topped and moved with minimal handling and bruising.

The maneuverability of the vegetable topper 28 has been improved with the addition of steerable rear wheels 114, especially combined with pickup piston 82. The pulling tractor can make as sharp a turn as its wheel base is capable of without fear of running over obstacles at the inside corner and without having to make numerous time-consuming forward to rearward moves to make a sharp turn. Jack-knifing, or contact between the rear of the tractor and the towed machine, is minimized as well. The steering is remotely hydraulically actuated for simplified operation.

We claim:

1. An apparatus for cutting the tops off of onions without damaging the bulb of the onion, comprising:
   a wheeled support frame;
   a fan mounted on the support frame and having a plurality of blades which rotate in a housing to create a suction and which is constructed with the blades sufficiently close to the housing, and rotating at such a speed that during operation the fan chops the tops of the onions into small pieces and discharges the chopped tops out of an exit from the fan housing, the fan housing having a non-stick lining on a portion of the inside of the housing adjacent the exit sufficient to prevent the chopped onion tops from sticking to the housing and clogging the fan;
   a suction hood depending from the support frame to a location proximal to a plurality of onions, the hood being in fluid communication with the fan in such a manner that sufficient suction is applied to the onions under the hood to lift up the tops of the onions away from the surface on which the onions are placed across substantially the entire area beneath the hood, the hood having a flexible skirt around at least a substantial portion of its periphery which skirt extends toward and can substantially enclose the onions; and a cutter bar located in the suction hood and extending along the length of the suction hood for a distance sufficient to provide a scissor-like cutting action to simultaneously cut the tops off a plurality of onions as the tops are lifted by the suction, the cutter bar being angled toward the onions and adjustably mounted so that the angle of cutting may be adjusted.

2. An apparatus as defined in claim 1, wherein the suction hood has a length sufficient to extend across a plurality of beds of onions, and further comprising:

a pickup conveyor located behind the suction hood and having a front end which can be positioned along a substantially vertical axis, with the front end being able to extend to just behind the suction hood, the conveyor rotating in a direction such that onions exiting from underneath the suction hood may be transported along the length of the pickup conveyor; and a cross-conveyor located so as to receive onions from the pickup conveyor and oriented at an angle to the pickup conveyor to move the onions to a predetermined location, the cross-conveyor being movably mounted relative to the support frame so as to enable said predetermined location to be changed relative to the frame.

3. An apparatus as defined in claims 1 or 2, further comprising a motor mounted on the frame to drive the fan.

4. An apparatus as defined in claims 1 or 2, wherein the wheeled support frame comprises a pair of wheels located at the rear of the support frame, with the wheels being steerably connected so as to enable the apparatus to turn corners sharper.

5. An apparatus as defined in claims 1 or 2, wherein the cutting angle is such that the tops are cut substantially square relative to the onion bulb.

6. An apparatus as defined in claims 1 or 2, further comprising a rotating shaft to which are attached a plurality of flexible members which rotate in a direction so as to urge the onion bulbs off of the ground onto a pickup conveyor.

7. An apparatus for mechanically cutting the tops off of tuber vegetables while not damaging the tubers, comprising:

a wheeled support frame;

a high velocity, high speed suction fan connected to said frame for creating a suction sufficient to lift the tops of tubers into a position for cutting, the fan further providing means for chopping the cut tops into a plurality of small pieces, the fan including a non-stick surface on those portions of the fan where chopped pieces of the vegetable tops would otherwise stick in sufficient quantity to clog the fan;

means for communicating the suction to an area covering a plurality of rows of tubers located beneath said frame with sufficient suction to lift the tops of the tubers into a position suitable for cutting; and scissors-type cutting means for simultaneously cutting the tops off of a plurality of tubers, said cutting means being adjustably mounted so the angle of the cutting means relative to the orientation of the tops may be adjusted.

8. An apparatus as defined in claim 7, wherein the suction communicating means extend across a plurality of beds of tubers, and further comprising:

first conveyor means for moving topped tubers from the ground behind the cutting means to a second location, the first conveyor means being movable relative to the ground; and cross-conveying means for receiving the tubers from the pickup conveyor and moving the tubers to a predetermined location, the cross-conveyor being movably mounted relative to the support frame so as to enable said predetermined location to be changed relative to the frame.

9. An apparatus as defined in claims 7 or 8, further comprising a motor mounted on the frame to drive the fan.

10. An apparatus as defined in claims 7 or 8, further comprising, means for steering the wheels on said frame to turn corners sharper.

11. An apparatus as defined in claims 7 or 8, further comprising, rotating means for urging tubers off of the ground onto a first conveyor means for conveying the tubers from the ground to another location.

12. An apparatus as defined in claims 7 or 8 wherein the tubers comprise onions.

13. An apparatus for cutting the tops of onions on the ground while providing a high yield of topped but undamaged onions, comprising:

a wheeled support frame having wheels spaced to coincide with the spaces between beds of onions;

a fan mounted on the support frame and having a plurality of blades which rotate in a housing to create a suction pressure and constructed such that during operation the fan rotates at a speed sufficient to chop the tops of the onions into small pieces and discharge the chopped tops out of an exit from the fan housing, the fan housing having a non-stick lining on a portion of the inside of the fan's housing to prevent the chopped onion tops from sticking to the housing and clogging the fan;

a generally rectangular suction hood depending from the support frame to a location adjacent the ground below the support frame, the hood being in fluid communication with the fan so that sufficient suction is applied to any onions under the hood to lift up the tops of the onions away from the ground and into a orientation suitable for cutting, the hood having a flexible skirt around a substantial portion of its periphery which skirt extends toward and can substantially enclose the onions on the ground below the hood, the hood and fan being long enough to encompass at least two beds of onions; and a cutter bar located in the suction hood and extending along the length of the suction hood for a distance sufficient to provide a scissor-like cutting action to simultaneously cut the tops off a plurality of onions as the tops are lifted by the suction, the cutter bar being angled downward and adjustably mounted so that the angle may be adjusted.

14. An apparatus as defined in claim 13, further comprising:

a pickup conveyor located behind the suction hood and extending along the length of the movable frame, the conveyor having a front end extending to behind the suction hood, the front end of the conveyor being vertically positionable, the conveyor rotating in a direction such that onions exiting from underneath the suction hood may be transported along the length of the pickup conveyor; and a cross-conveyor located so as to receive onions from the pickup conveyor and oriented at a substantially right angle to the pickup conveyor to move the onions to a predetermined location, the cross-conveyor being movably mounted relative to the support frame so as to enable said predetermined location to be changed relative to the frame.

15. An apparatus as defined in claims 13 or 14, further comprising a motor mounted on the frame to drive the fan.

16. An apparatus as defined in claims 13 or 14, wherein the wheeled support frame comprises a pair of wheels located at the rear of the support frame, with the wheels being steerably connected so as to enable the apparatus to turn corners sharper.

17. A method for mechanically cutting the tops off of tuber vegetables while not damaging the tubers, comprising the steps of:
using a high speed fan with a plurality of fan blades to create a suction sufficient to lift the tops of tubers into a position for cutting;
using the blades of the suction fan to further chop the cut-off tops into a plurality of small pieces;
placing a non-stick surface on those portions of the fan where chopped pieces of the vegetable tops would otherwise stick in sufficient quantity to clog the fan so that the chopped tops do not stick and clog the fan;
communicating the suction to an area covering a plurality of rows of tubers with sufficient suction on even the tubers at the edge of said area to lift the tops of the tubers as needed for cutting; and
simultaneously cutting a plurality of tops with a scissors-type cutting action.

18. A method as defined in claim 17, wherein the cutting step further comprises the step of cutting with a cutting bar having an adjustable cutting angle, and comprising the further step of adjusting the angle of cutting bar relative to the uplifted tops so that the tops are cut off at substantially right angles.

19. A method as defined in claims 17 or 18, wherein said cutting step occurs before the tubers are broken loose from the ground.

20. A method as defined in claims 17 or 18, comprising further steps of:
moving the topped tubers from the ground to a second location by using a pickup conveyor; and
moving the tubers from the second location of the pickup conveyor to a third location by a cross-conveyor, the cross-conveyor being positionable to allow the third position to be changed.

21. A method as defined in claims 17 or 18, wherein said fan creates sufficient suction to lift rotted tubers into the cutter bar.

22. A method for cutting the tops of tubers without damaging the tuber, comprising:
using a fan located inside a housing to create a suction force;
communicating sufficient suction to a plurality of tuber tops so as to cause the tops of the tubers to assume an upright orientation;
simultaneously cutting the tops of the plurality of tubers with a scissor-type cutting device, without damaging the tubers;
adjusting the angle of the cutting device relative to the ground to a downward angle that efficiently cuts the tuber tops off close to the tuber without damaging the tubers;
chopping the cutoff tops of the tubers into a plurality of smaller pieces by using the same fan that creates the suction to chop the tops and ejecting those chopped tops away from the fan through a fan exhaust port;
preventing the chopped tops from clogging the fan by placing a non-stick lining on portions of the inside of the fan housing adjacent the fan exhaust port to prevent the chopped tuber tops from sticking to the housing.

23. A method as defined in claim 22, wherein said cutting step occurs before the tubers are broken loose from the ground.

24. A method as defined in claim 22, wherein the tubers comprise onions.

25. A method as defined in claims 22, 23 or 24, wherein said cutting step occurs after the tubers are broken loose from the ground, and comprising the further steps of:
picking up the topped tubers by use of a pickup conveyor immediately after the tops of the tubers are cut off; and
moving the tubers from the pickup conveyor to a predetermined location by a cross-conveyor located so as to receive tubers from the pickup conveyor and oriented at an angle to the pickup conveyor, the cross-conveyor being movably mounted relative to the support frame so as to enable said predetermined location to be changed.

26. A method as defined in claims 22, 23 or 24, comprising the further step of: steering the device which implements the method of cutting the tops of the tubers by a pair of wheels located at the rear of the device, to enable the device to turn corners sharper.

* * * * *